US011929980B1

(12) United States Patent
Karpuska

(10) Patent No.: US 11,929,980 B1
(45) Date of Patent: *Mar. 12, 2024

(54) SHARING DOMAIN NAME SERVICE RESOURCES IN A MESH NETWORK

(71) Applicant: UAB 360 IT, Vilnius (LT)

(72) Inventor: Rytis Karpuska, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,532

(22) Filed: May 22, 2023

(51) Int. Cl.
*H04L 61/4511* (2022.01)
*H04L 101/668* (2022.01)

(52) U.S. Cl.
CPC .... *H04L 61/4511* (2022.05); *H04L 2101/668* (2022.05)

(58) Field of Classification Search
None
See application file for complete search history.

(56) References Cited

U.S. PATENT DOCUMENTS

| | | | |
|---|---|---|---|
| 6,425,003 B1* | 7/2002 | Herzog | G06F 9/44589 709/223 |
| 8,145,788 B1* | 3/2012 | Love | H04L 61/4511 709/219 |
| 2004/0095962 A1* | 5/2004 | Ohta | H04L 61/4511 370/389 |
| 2008/0201477 A1* | 8/2008 | Gray | H04L 41/0806 709/227 |
| 2014/0211807 A1* | 7/2014 | Takenaka | H04L 49/15 370/392 |
| 2015/0372912 A1* | 12/2015 | Parla | H04L 61/5007 709/245 |
| 2016/0006624 A1* | 1/2016 | Martini | H04L 61/5007 709/224 |
| 2017/0034773 A1* | 2/2017 | Kuehnel | H04L 41/00 |
| 2017/0155618 A1* | 6/2017 | Amishav | H04L 41/5058 |
| 2018/0300760 A1* | 10/2018 | Leppanen | H04W 4/02 |
| 2021/0051002 A1* | 2/2021 | Cheng | H04L 9/088 |
| 2021/0152513 A1* | 5/2021 | Grayson | H04L 61/4511 |
| 2022/0174032 A1* | 6/2022 | Zhu | H04L 67/146 |
| 2023/0106413 A1* | 4/2023 | Feldpusch | H04L 61/4511 709/245 |

* cited by examiner

*Primary Examiner* — Joshua Joo
(74) *Attorney, Agent, or Firm* — The Pattani Law Group

(57) ABSTRACT

The disclosure describes a mesh network including a first device and a second device. The first device transmits, to the second device, a query packet containing a DNS query for querying domain information of an external device, and the second device that transmits the DNS query to a DNS server to receive the domain information. The second device transmits, to the first device, the domain information of the external device. The first device transmits, to the second device, an initiation packet containing a network initiation packet for communicating with the external device, the network initiation packet including the domain information, and the second device transmits, over a network connection, the network initiation packet to the external device based on utilizing the domain information in the network initiation packet. The disclosure describes various other contemplated aspects.

20 Claims, 7 Drawing Sheets

SHARING DOMAIN NAME SERVICE RESOURCES IN A MESH NETWORK

FIELD OF DISCLOSURE

Aspects of the present disclosure generally relate to communications in networks, and more particularly to sharing domain name service (DNS) resources in a mesh network.

BACKGROUND

Users may rely on mesh networks (also referred to as "meshnets") to communicate (e.g., transmit and/or receive) data among a plurality of endpoints (e.g., user devices) via one or more Internet nodes (e.g., bridges, switches, infrastructure devices, etc.). In an example, a mesh network may include a plurality of endpoints communicatively coupled to each other directly or via the one or more Internet nodes. A mesh network in which all endpoints are communicatively coupled to each other may be referred to as a fully connected network. Data transmitted by a first endpoint, from among the plurality of endpoints, may be routed over the Internet via the one or more Internet nodes to a second endpoint from among the plurality of endpoints. Also, data transmitted by the first endpoint may be routed to two or more endpoints from among the plurality of endpoints.

In a mesh network, the plurality of endpoints may cooperate with each other to enable communication of the data among the plurality of endpoints. In an example, one or more of the endpoints may participate in communication of the data. In this way, the mesh network may avoid relying on a given endpoint for communication of the data. Some mesh networks may have the ability to dynamically self-organize and self-configure the plurality of endpoints. This ability may allow such mesh networks to enable dynamic distribution of workloads, particularly in the event that one or more endpoints should fail. Further, installation overhead may be reduced.

SUMMARY

In one aspect, the present disclosure contemplates a method in a mesh network including a first user device and a second user device in communication with each other via a meshnet connection, the second user device being connected to a local area network (LAN) that includes a domain name service (DNS) server, the method comprising: the first user device transmitting, to the second user device over the meshnet connection, a meshnet query packet that includes a DNS query packet querying for domain information associated with an external device that is outside the mesh network, the DNS query packet including access information associated with the DNS server to indicate that the second user device is to utilize the DNS server in the LAN to obtain the domain information; the second user device transmitting, over a LAN connection, the DNS query packet to the DNS server, and receiving, over the LAN connection based at least in part on transmitting the DNS query packet, the domain information from the DNS server; the second user device transmitting, to the first user device over the meshnet connection, the domain information associated with the external device; the first user device transmitting, to the second user device over the meshnet connection, a meshnet initiation packet that includes a network initiation packet for communicating with the external device, the network initiation packet including the domain information; and the second user device transmitting, over a network connection, the network initiation packet to the external device based at least in part on utilizing the domain information in the network initiation packet.

In another aspect, the present disclosure contemplates a mesh network including a first user device; and a second user device in communication with the first user device via a meshnet connection in the mesh network, the second user device being connected to a local area network (LAN) that includes a domain name service (DNS) server, wherein the first user device is configured to transmit, to the second user device over the meshnet connection, a meshnet query packet that includes a DNS query packet querying for domain information associated with an external device that is outside the mesh network, the DNS query packet including access information associated with the DNS server to indicate that the second user device is to utilize the DNS server in the LAN to obtain the domain information; the second user device is configured to transmit, over a LAN connection, the DNS query packet to the DNS server, and to receive, over the LAN connection based at least in part on transmitting the DNS query packet, the domain information from the DNS server; the second user device is configured to transmit, to the first user device over the meshnet connection, the domain information associated with the external device; the first user device is configured to transmit, to the second user device over the meshnet connection, a meshnet initiation packet that includes a network initiation packet for communicating with the external device, the network initiation packet including the domain information; and the second user device is configured to transmit, over a network connection, the network initiation packet to the external device based at least in part on utilizing the domain information in the network initiation packet.

In another aspect, the present disclosure contemplates a non-transitory computer-readable medium configured to store instructions, which when executed by a first user device or a second user device in communication with each other via a meshnet connection in a mesh network, the second user device being connected to a local area network (LAN) that includes a domain name service (DNS) server, configure the first user device to transmit, to the second user device over the meshnet connection, a meshnet query packet that includes a DNS query packet querying for domain information associated with an external device that is outside the mesh network, the DNS query packet including access information associated with the DNS server to indicate that the second user device is to utilize the DNS server in the LAN to obtain the domain information; configure the second user device to transmit, over a LAN connection, the DNS query packet to the DNS server, and to receive, over the LAN connection based at least in part on transmitting the DNS query packet, the domain information from the DNS server; configure the second user device to transmit, to the first user device over the meshnet connection, the domain information associated with the external device; configure the first user device to transmit, to the second user device over the meshnet connection, a meshnet initiation packet that includes a network initiation packet for communicating with the external device, the network initiation packet including the domain information; and configure the second user device to transmit, over a network connection, the network initiation packet to the external device based at least in part on utilizing the domain information in the network initiation packet.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
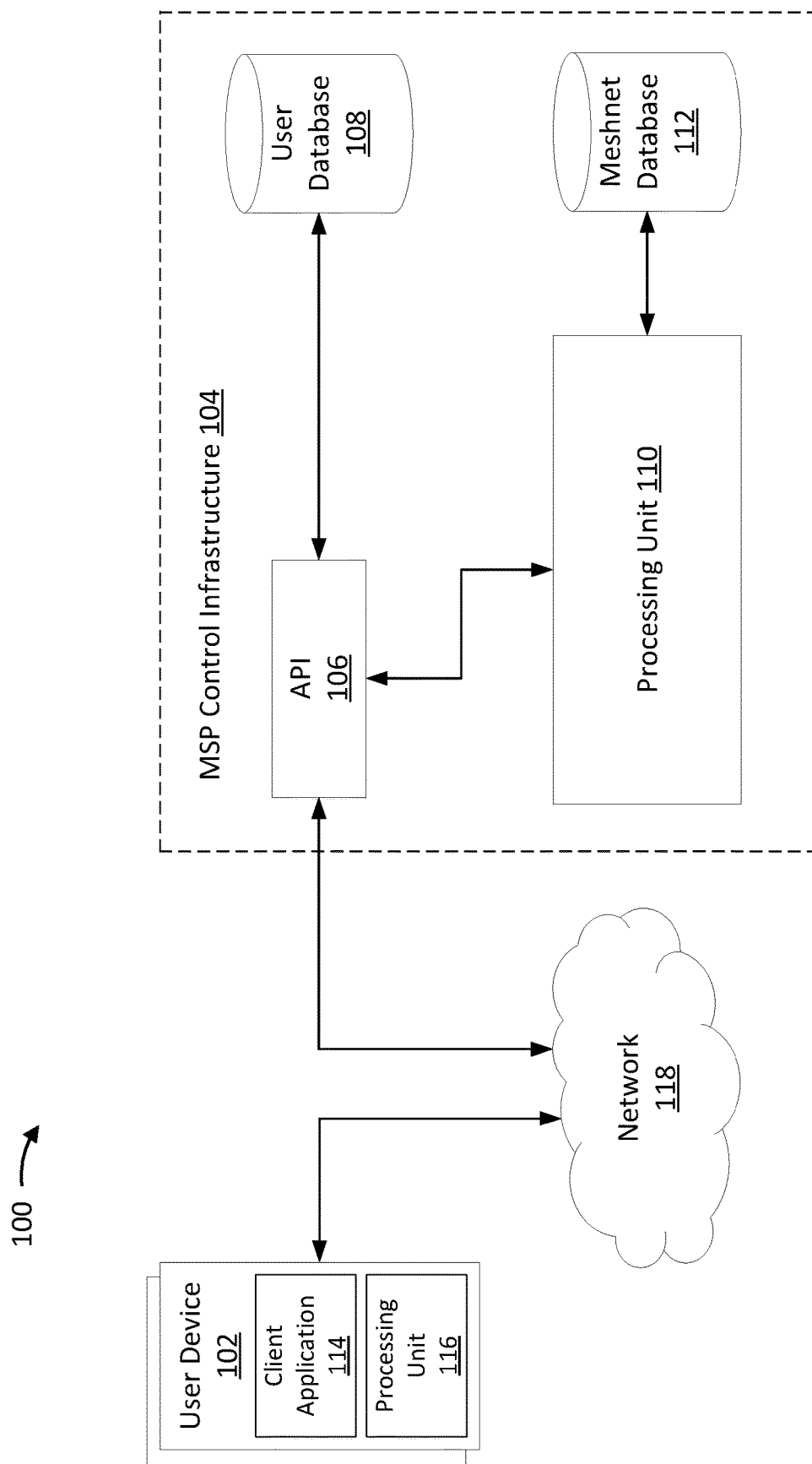

FIG. 1 is an illustration of an example system associated with sharing DNS resources in a mesh network, according to various aspects of the present disclosure.

Figure 2:
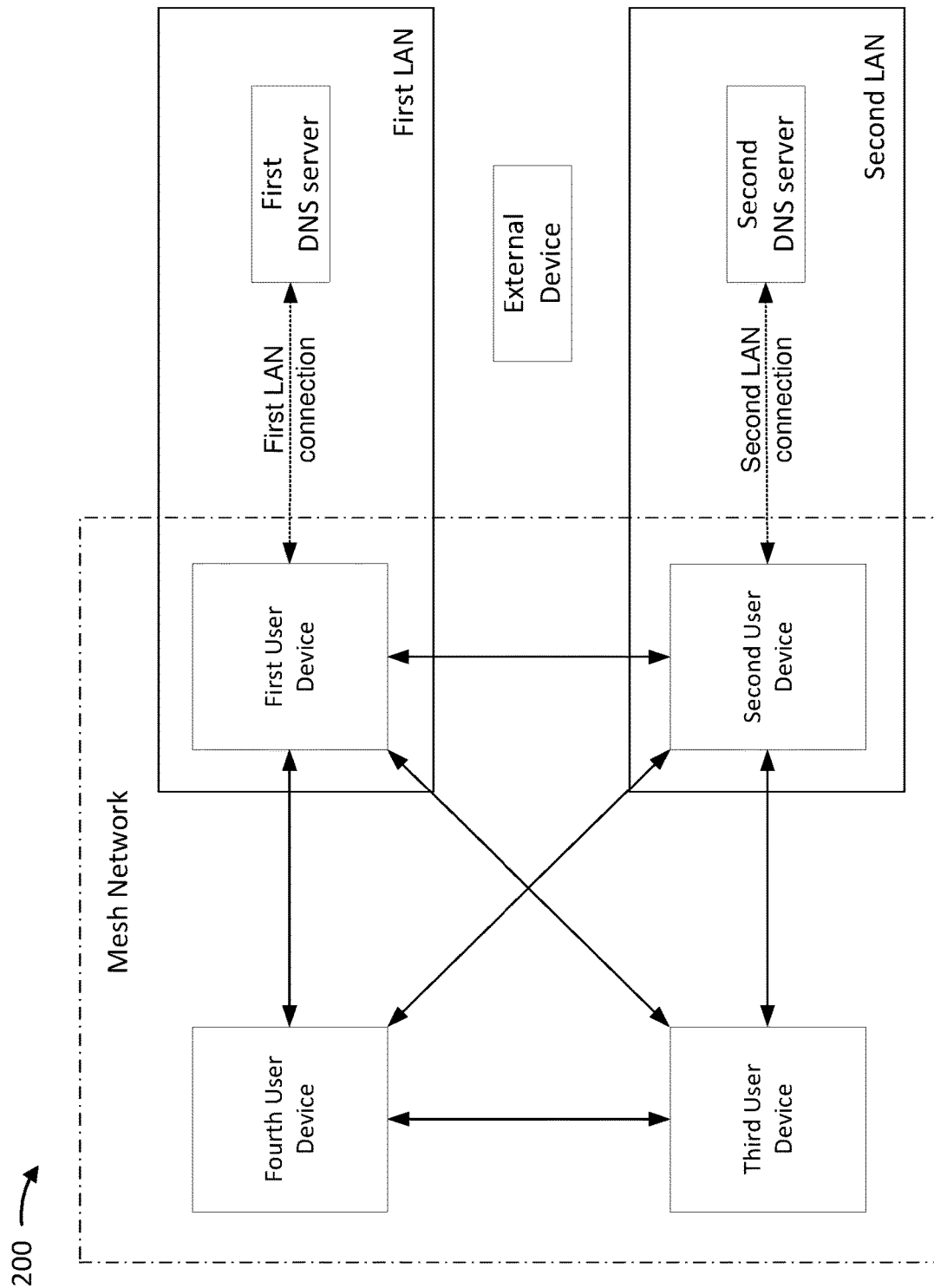

FIG. 2 is an illustration of an example associated with sharing DNS resources in a mesh network, according to various aspects of the present disclosure.

Figure 3:
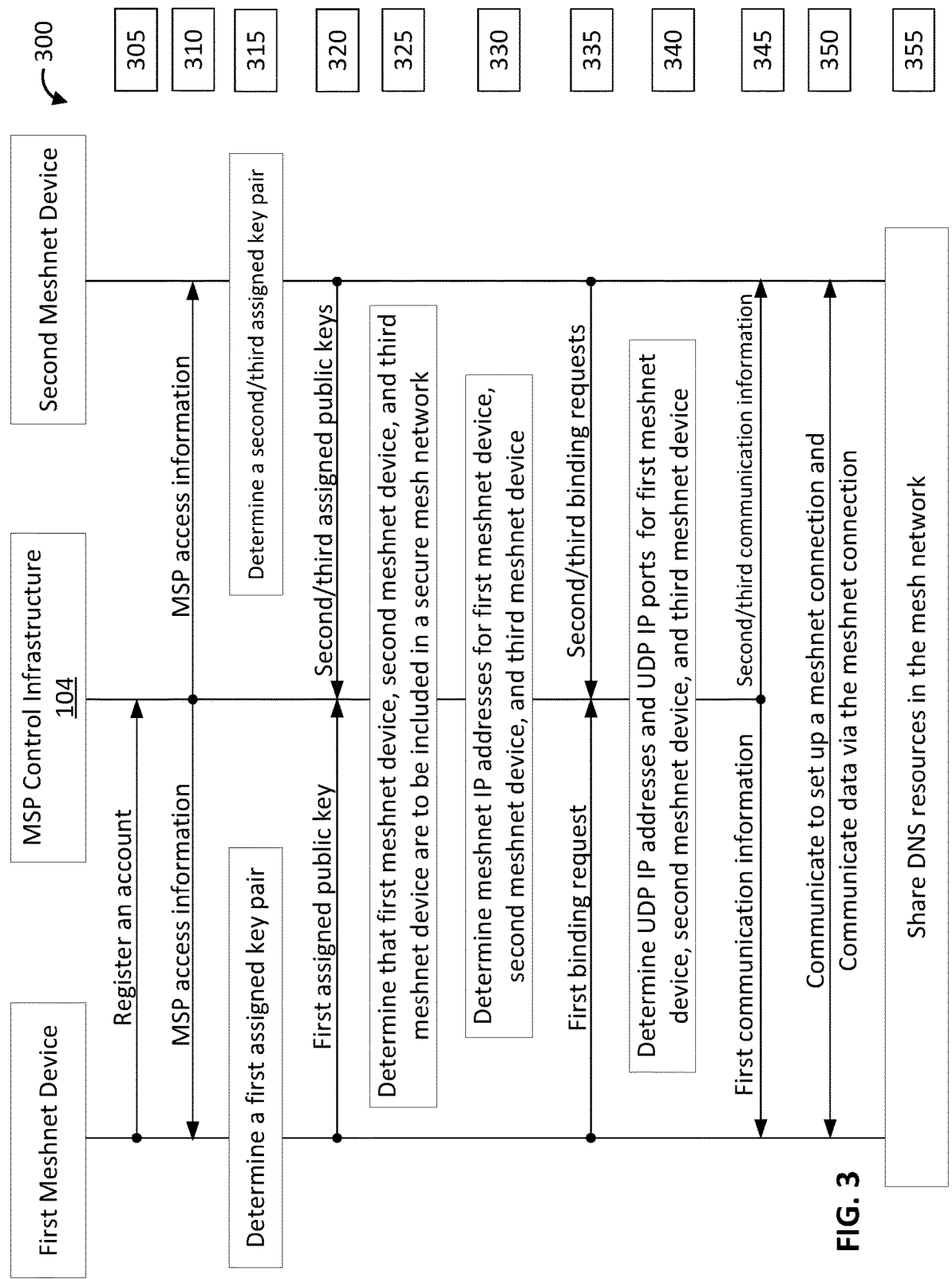

FIG. 3 is an illustration of an example flow associated with sharing DNS resources in a mesh network, according to various aspects of the present disclosure.

Figure 4:
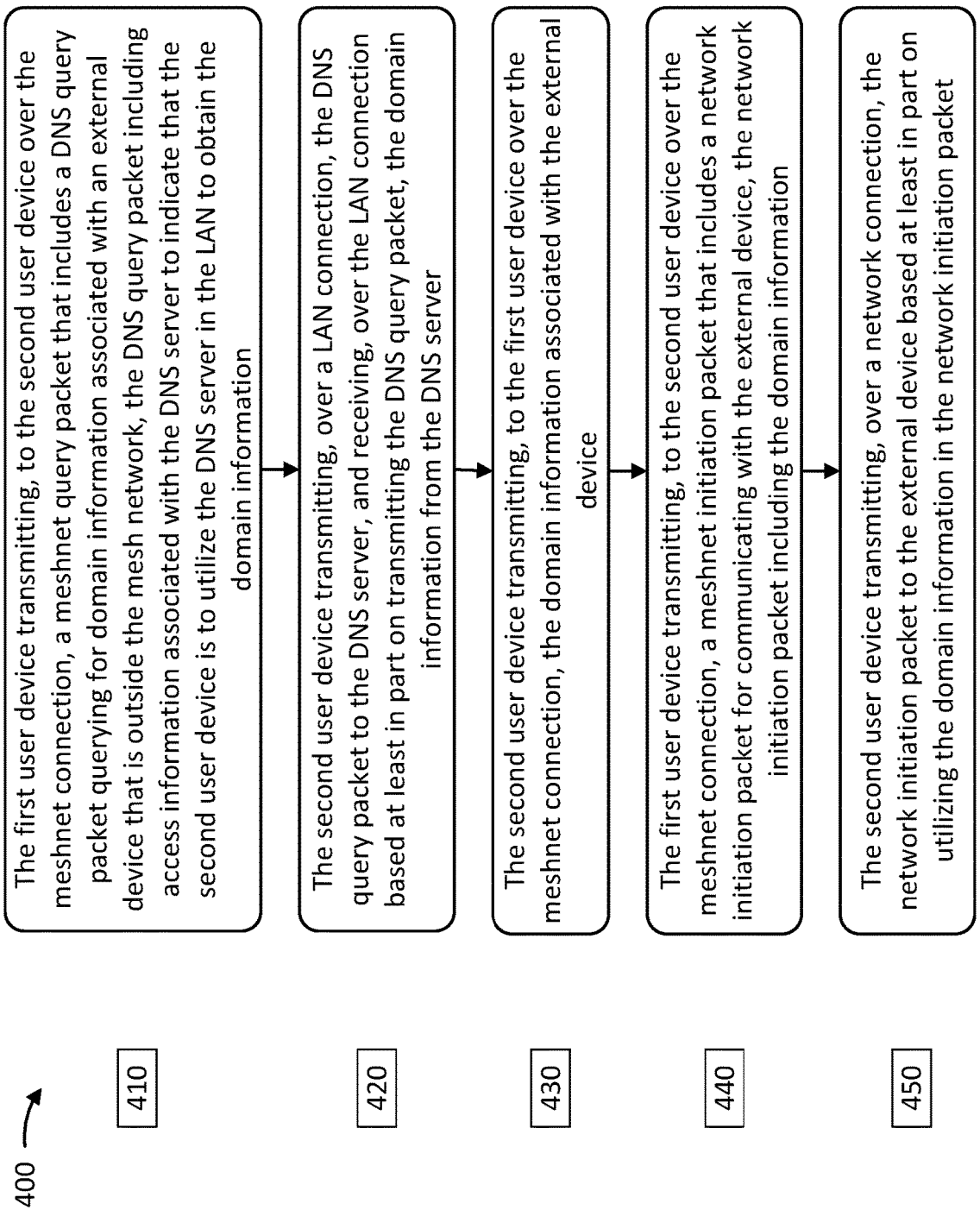

FIG. 4 is an illustration of an example process associated with sharing DNS resources in a mesh network, according to various aspects of the present disclosure.

Figure 5:
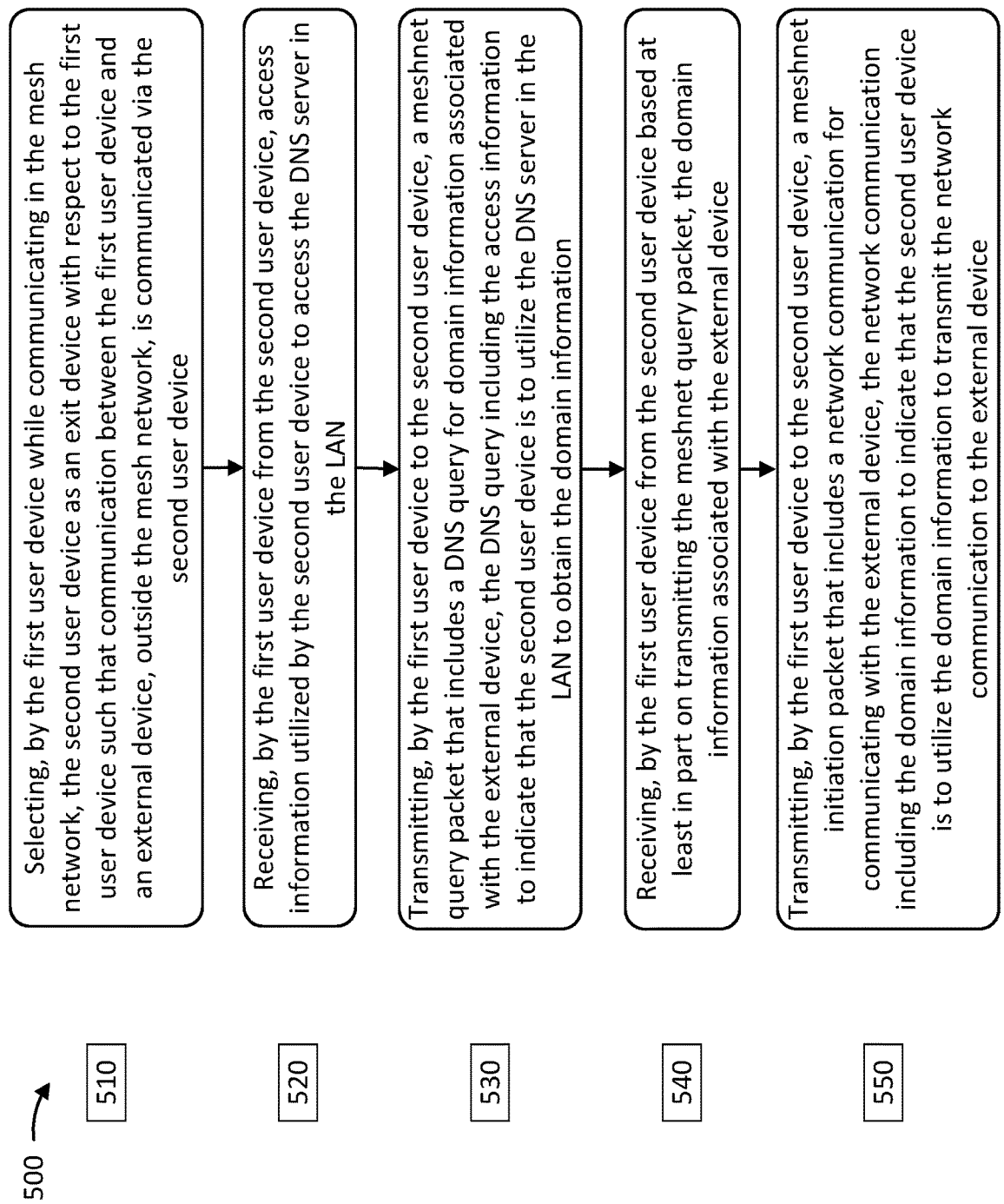

FIG. 5 is an illustration of an example process associated with sharing DNS resources in a mesh network, according to various aspects of the present disclosure.

Figure 6:
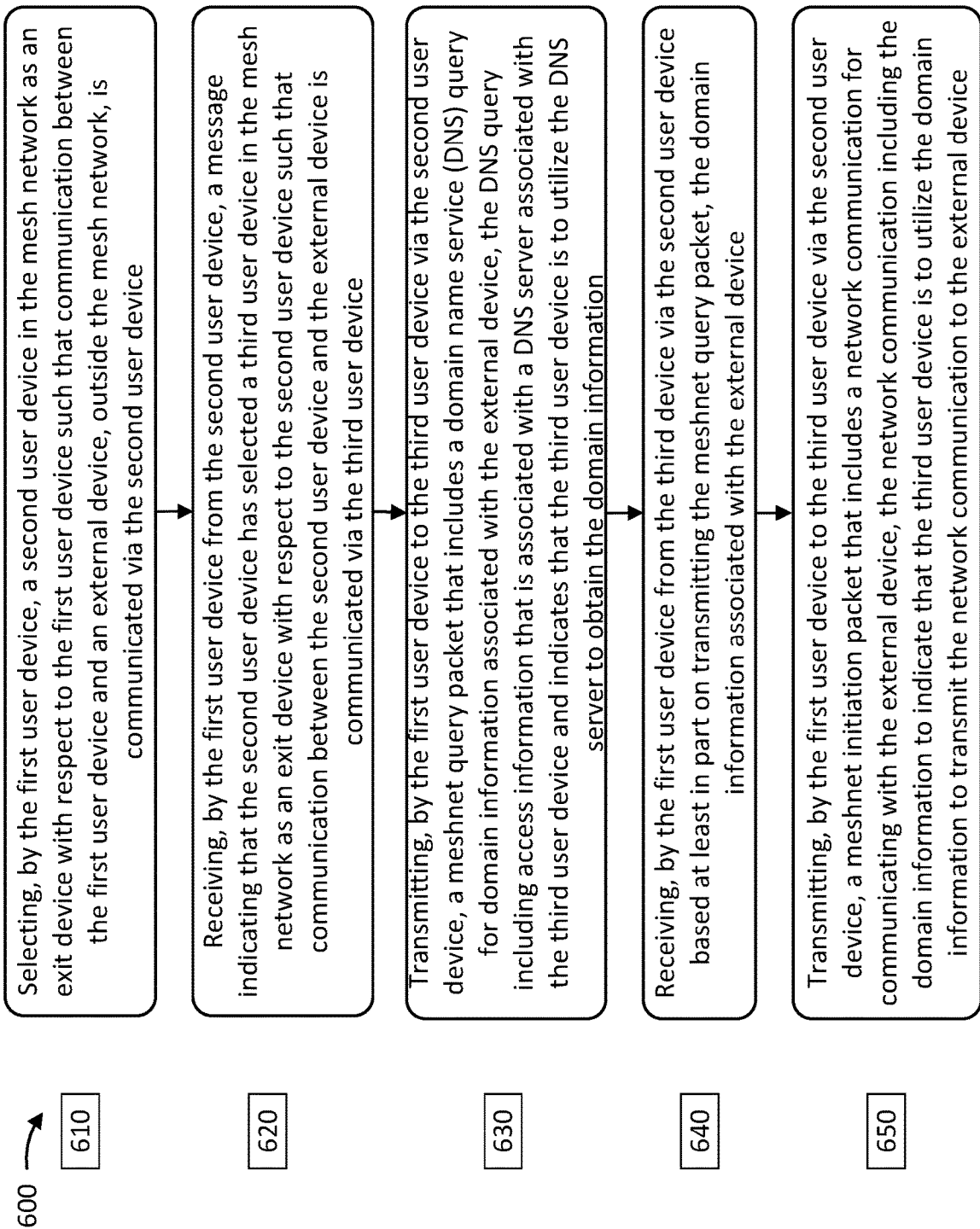

FIG. 6 is an illustration of an example process associated with sharing DNS resources in a mesh network, according to various aspects of the present disclosure.

Figure 7:
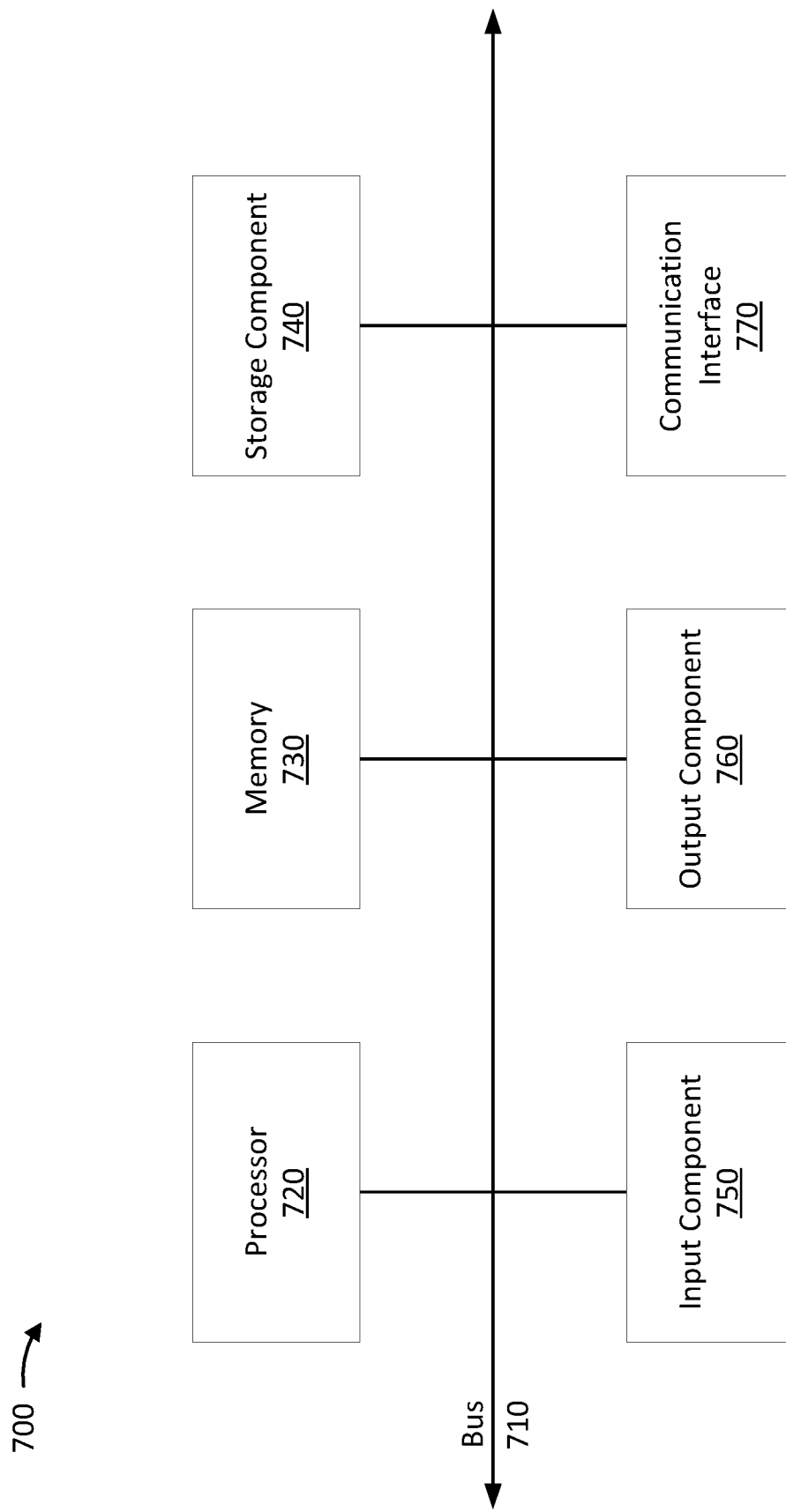

FIG. 7 is an illustration of example devices associated with sharing DNS resources in a mesh network, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example 100 associated with sharing DNS resources in a mesh network, according to various aspects of the present disclosure. Example 100 shows an architectural depiction of included components. In some aspects, the components may include one or more user devices 102 capable of communicating with a mesh network service provider (MSP) control infrastructure 104 for purposes of obtaining mesh network services. In some aspects, the one or more user devices 102 may communicate with the MSP control infrastructure 104 over a network 118. The MSP control infrastructure 104 may be controlled by a mesh network service provider and may include an application programming interface (API) 106, a user database 108, processing unit 110, and a meshnet database 112. In some aspects, a user device 102 may utilize a processing unit 116 and/or a client application 114, which is provided by the MSP control infrastructure 104, to communicate with the API 106. The API 106 may be capable of communicating with the user database 108 and with the processing unit 110. Additionally, the processing unit 110 may be capable of communicating with the meshnet database 112, which may be capable of storing data associated with providing mesh network services.

The user device 102 may be a physical computing device capable of hosting the client application 114 and of connecting to the network 118. The user device 102 may be, for example, a laptop, a mobile phone, a tablet computer, a desktop computer, a smart device, or the like. In some aspects, the user device 102 may include, for example, Internet-of-Things (IoT) devices such as smart home appliances, smart home security systems, autonomous vehicles, smart health monitors, smart factory equipment, wireless inventory trackers, biometric cyber security scanners, or the like.

The network 118 may be any analog and/or digital telecommunication network that permits several nodes to share and access resources. In some aspects, the network 118 may include one or more of, for example, a local-area network (LAN), a wide-area network (WAN), a campus-area network (CAN), a metropolitan-area network (MAN), a home-area network (HAN), Internet, Intranet, Extranet, and/or Internetwork.

The MSP control infrastructure 104 may include a combination of hardware and software components that enable provision of mesh network services to the user device 102. The MSP control infrastructure 104 may interface with (the client application on) the user device 102 via the API 106, which may include one or more endpoints to a defined request-response message system. In some aspects, the API 106 may be configured to receive, via the network 118, a connection request from the user device 102 to establish a connection with the MSP control infrastructure 104 for purposes of obtaining the mesh network services. The connection request may include an authentication request to authenticate the user device 102 as a subscriber of the mesh network services. The API 106 may receive the authentication request and a request for the mesh network services in a single connection request. In some aspects, the API 106 may receive the authentication request and the request for the mesh network services in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authorized user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The mesh network service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the mesh network service provider may provide mesh network services to the user device 102. When the received credentials fail to match at least one of the valid credentials, the user database 108 and the processor may fail to authenticate the user device 102. In this case, the mesh network service provider may decline to provide mesh network services to the user device 102.

When the user device 102 is authenticated, the user device 102 may initiate a connection and may transmit to the API 106 a request for the mesh network services. The processing unit 110 included in the MSP control infrastructure 104 may be configured to determine a mesh network associated with the user device 102 and/or to identify one or more user devices to be included within the determined mesh network. The processing unit 110 may utilize the API 106 to transmit information associated with the mesh network and/or the identified one or more user devices to the user device 102. The user device 102 may transmit an initiation request to establish secure connections (e.g., encrypted tunnels) with the one or more user devices. In some aspects, the one or more user devices with which the user device 102 establishes the secure connections may also host respective client applications for communicating with the MSP control infrastructure 104 and/or with the user device 102. In some aspects, the processing unit 110 may be a logical unit including a logical component configured to perform complex operations associated with computing, for example, numerical weights related to various factors associated with providing the meshnet services.

One or more components (e.g., API 106, user database 108, processing unit 110, and/or meshnet database 112, processing unit 116) included in the MSP control infrastructure 104 and/or included in the user device 102 may further be associated with a controller/processor, a memory, a communication interface, an input component, an output component, or a combination thereof (e.g., FIG. 7). For instance, the one or more components may include or may be included in a controller/processor, a memory, or a combination thereof. In some aspects, the one or more components may be separate and distinct from each other. Alternatively, in some aspects, the one or more components may be combined with another one of the one or more components. In some aspects, the one or more may be local with respect to each other. Alternatively, in some aspects, the one or more components may be located remotely with another one of the one or more components. Additionally, or alternatively, the one or more components may be implemented at least in part as software stored in a hardware memory. For example, a component (or a portion of a component) may be implemented as instructions or code stored in a non-transitory computer-readable medium and executable by a controller or a processor to perform the functions or operations of the component. Additionally, or alternatively, the one or more components shown in FIG. 1 may be configured to perform one or more functions described as being performed by another one of the one or more components shown in FIG. 1.

As indicated above, FIG. 1 is provided as an example. Other examples may differ from what is described with regard to FIG. 1.

A plurality of user devices may rely on a mesh network to communicate (e.g., transmit and/or receive) data among the user devices. In example 200 shown in FIG. 2, the user devices may include a first user device, a second user device, a third user device, and/or a fourth user device. User devices may leave the mesh network and other user devices may join the mesh network in an ad-hoc manner. The data may be communicated using wired communications and/or wireless communications over a network such as, for example, the Internet. The mesh network may be a secure mesh network that may enable the user devices to communicate the data in encrypted form via meshnet connections (shown as double-ended arrows in FIG. 2). The communicated data may include any information including digital information such as, for example, folders, files, documents, voice data, image data, signal data, and/or video data.

The user devices in the mesh network may also correspond (e.g., communicate data) with an external device (e.g., user device, server device, host device, etc.) outside the mesh network. To do so, a user device (e.g., entry device) may freely select another user device (e.g., exit device) in the mesh network as an exit device. In this case, correspondence between the entry device and the external device may be routed (e.g., communicated) via the selected exit device. In the mesh network of example 200, the first user device may select the second user device as an exit device. In this case, correspondence (e.g., communicated data) between the first user device and an external device may be routed via the second user device.

As shown in FIG. 2, the first user device may be associated with a first local area network (LAN). Further, the first LAN may include and/or be associated with a first domain name services (DNS) server for providing DNS services to devices (e.g., first user device) associated with the first LAN. For instance, the first user device may utilize the first DNS server to resolve domain name queries associated with external devices outside the mesh network. Similarly, the second user device may be associated with a second LAN. Further, the second LAN may include and/or be associated with a second DNS server for providing DNS services to devices (e.g., second user device) associated with the second LAN. For instance, the second user device may utilize the second DNS server to resolve domain name queries associated with external devices outside the mesh network.

Similarly, although not shown in FIG. 2, the third and fourth user devices may respectively be associated with third and fourth LANs that respectively include third and fourth DNS servers.

In some cases, because the first DNS server is associated with the first LAN, and not with the second LAN, the second user device may not have access to the first DNS server. Similarly, because the second DNS server is associated with the second LAN, the first user device may not have access to the second DNS server. As a result, when the first user device is the entry device and the second user device is the exit device, and the first user device is to query domain information (e.g., IP address, etc.) associated with the external device to enable the first user device to communicate with the external device, the first user device may not be able to utilize the second DNS server due to unavailability of information to access the second DNS server.

In this case, to query the domain name, the first user device may transmit a DNS query to the second user device, the DNS query including access information (e.g., DNS server IP address) associated with a public DNS server that is separate from the first DNS server and the second DNS server. As the exit device, the second user device may forward the DNS query over the open Internet to the public DNS server based at least in part on the access information included in the DNS query. The public DNS server may resolve the DNS query and return the domain information associated with the external device to the second user device, which may forward the domain information to the first user device. The first user device may utilize the domain information to determine the data (e.g., IP packets) to be transmitted to the external device, and may transmit the determined data to the second user device for communication to the external device.

Accessing the public DNS server for resolution of the DNS query may compromise private information associated with the first and/or second user devices (e.g., a location of the user device, a list of websites visited by the user device, a nature of data requested by the user device, or the like) because communication between the second user device and the public DNS server over the open Internet may be unencrypted and monitored and/or intercepted by a malicious party. Such monitoring and/or interception may allow the malicious third party to discover and track the private information associated with the first and/or second user devices. As a result, the private information associated with the first and/or second user devices may be compromised, and the first and/or second user devices may be unable to, among other things, rely on the mesh network to communicate data. In another example, based at least in part on intercepting the communication, the malicious third party may introduce malware in the communication, the malware being designed to disrupt, damage, and/or gain unauthorized access to the first and/or second user devices. The malware may also adversely affect operating systems of the first and/or second user devices such that the operating systems may run slower and/or associated circuitry may emit excessive heat and/or noise, thereby causing damage to the first and/or second user devices. The first and/or second user devices may expend various device resources (e.g., processing resources, memory resources, power consumption resources, battery life, or the like) in efforts to mitigate effects of the private information becoming compromised and issues caused by the malware.

Additionally, the public DNS server may gain unauthorized access to the private information associated with the first and/or second user devices. For instance, the public DNS server may include tracking software in the communication to enable the public DNS server to trace, identify, and/or collect the private information associated with the first and/or second user devices. In another example, the public DNS server may analyze information included in the DNS query (e.g., the exit IP address, or the like) to determine locations of the first and/or second user devices. In yet another example, communications indicating the private information may be redirected to a malicious party. As a result, privacy of the user device may be compromised. The first and/or second user devices may expend various device resources (e.g., processing resources, memory resources, power consumption resources, battery life, or the like) in efforts to mitigate effects of the private information becoming compromised.

Accessing the public DNS server for resolution of the DNS query may also introduce a delay in obtaining the domain information associated with the external device because the second user device is to access the public DNS server instead of the second DNS server, which may be able to provide speedier DNS resolution to the second user device. Introduction of the delay may result in inefficient utilization of user device resources (e.g., processing resources, memory resources, power consumption resources, battery life, or the like) and network resources (computational resources, network bandwidth, management resources, processing resources, memory resources, or the like) that can otherwise be used to perform suitable tasks associated with the mesh network.

Various aspects of systems and techniques discussed in the present disclosure enable sharing DNS resources in a mesh network. In some aspects, an MSP control infrastructure may provide the mesh network to enable user devices (e.g., meshnet devices) to securely communicate data. Further, the MSP control infrastructure may provide the user devices with respective client applications to perform operations associated with the mesh network including, for example, communicating with each other for setting up respective meshnet connections to be utilized for communicating the data in the mesh network, communicating data with each other over the respective meshnet connections, communicating data with external devices outside the mesh network, selectively transmitting respective status messages indicating as entry devices and/or exit devices, and/or sharing DNS resources. In some aspects, to share the DNS resources, the respective client applications may enable the user devices to exchange DNS information related to respective LANs associated with the user devices.

In an example, a first user device may transmit to all meshnet devices first DNS information associated with a first DNS server with which the first user device is associated via the first LAN. The first DNS information may include, for example, first access information (e.g., first subnet IP address assigned to the first DNS server) utilized by devices associated with the first LAN to access the first DNS server. Similarly, a second user device may transmit to all meshnet devices second DNS information associated with a second DNS server with which the second user device is associated via the second LAN. The second DNS information may include, for example, second access information (e.g., second subnet IP address assigned to the second DNS server) utilized by devices associated with the second LAN to access the second DNS server. When the first user device is the entry device and the second user device is the exit device, and the first user device is to query domain information (e.g., IP address, running services, keys, authorization information, etc.) associated with an external device to enable the first user device to communicate with the external device, the first user device may transmit a DNS query to the second user device, the DNS query including the received access information (e.g., second subnet IP address) associated with the second DNS server. As the exit device, the second user device may forward the DNS query via a second LAN connection to the second DNS server based at least in part on the access information included in (e.g., a header included in) the DNS query. The second DNS server may resolve the DNS query and return the domain information (e.g., IP address) associated with the external device to the second user device, which may forward the domain information to the first user device. The first user device may utilize the domain information to determine data (e.g., IP packets) to be transmitted to the external device, and may transmit the determined data to the second user device for communication to the external device. By sharing the DNS resources, the user devices in the mesh network may avoid accessing a public DNS server for querying the domain information associated with the external device. As a result, the user devices may mitigate instances of private information associated with the user devices becoming compromised. Additionally, the user devices may avoid introducing a delay in obtaining the domain information associated with the external device. In this way, the MSP control infrastructure and the respective client applications may enable efficient utilization of user device resources (e.g., processing resources, memory resources, power consumption resources, battery life, or the like) and network resources (computational resources, network bandwidth, management resources, processing resources, memory resources, or the like) for suitable tasks associated with the mesh network.

As indicated above, FIG. 2 is provided as an example. Other examples may differ from what is described with regard to FIG. 2.

FIG. 3 is an illustration of an example flow 300 associated with sharing DNS resources in a mesh network, according to various aspects of the present disclosure. The example flow 300 may include a first user device (e.g., first meshnet device), MSP control infrastructure 104, and a second user device (e.g., second meshnet device) in communication with each other. The first user device and the second user device may be similar to a user device 102 discussed above with respect to FIG. 1. The first user device may install a first client application (e.g., client application 114) and the second user device may install a second client application (e.g., client application 114), the first client application and the second client application being associated with (e.g., provided by) the MSP control infrastructure 104. The first user device and the second user device may use the respective client applications to communicate with an application programming interface (API) and/or a processor (e.g., processing unit 110, processor 720) associated with the MSP control infrastructure 104. In some aspects, the first user device, the MSP control infrastructure 104, and the second user device may communicate with each other over a network (e.g., network 118). In some aspects, as discussed elsewhere herein, the MSP control infrastructure 104 may enable the first user device and/or the second user device to obtain the mesh network services via the respective client applications.

Although only two user devices (e.g., user devices) are shown in FIG. 3, the present disclosure contemplates the mesh network to include any number of user devices that perform the processes discussed herein in a similar and/or analogous manner. For instance, the mesh network may include a third user device and a fourth user device, as discussed above with respect to FIG. 2, that perform the processes discussed herein in a similar and/or analogous manner. Further, user devices may leave and join the mesh network in an ad-hoc manner.

In some aspects, the first user device and the second user device may be associated with a single account registered with the MSP control infrastructure 104. In some aspects, the first user device and the second user device may be associated with different accounts registered with the MSP control infrastructure 104. In some aspects, the first user device and the second user device may be located locally (e.g., in the same room, in the same building, etc.). In some aspects, the first user device and the second user device may be located remotely (e.g., in different buildings, in different cities, in different states, in different countries, etc.) with respect to each other.

In some aspects, the respective client applications may enable the user devices to receive information to be processed by the respective client applications and/or by the MSP control infrastructure 104. Each of the client applications may enable respective graphical user interfaces to receive the information via local input interfaces (e.g., touch screen, keyboard, mouse, pointer, etc.) associated with the user devices. The information may be received via text input or via a selection from among a plurality of options (e.g., pull down menu, etc.). In some aspects, the first client application and/or the second client application may activate and/or enable, at a time associated with the registration (e.g., after the registration) of the account, the graphical interface for receiving the information. For instance, the first client application (or the second client application) may cause a screen (e.g., local screen) associated with the first user device (or the second user device) to display, for example, a pop-up message to request entry of the information. Further, the client applications may enable transmission of at least a portion of the received information to the MSP control infrastructure 104. In some aspects, as discussed below in further detail, the first client application may utilize a first processing unit (e.g., processing unit 116, processor 720) included in the first user device to perform processes/operations associated with obtaining the mesh network services and the second application may utilize a second processing unit (e.g., processing unit 116, processor 720) included in the second user device to perform processes/operations associated with obtaining the mesh network services.

As shown by reference numeral 305, the first user device may register an account with the MSP control infrastructure 104. In some aspects, during the registration, the first user device may provide registration information such as, for example, identity of an owner of the first user device, a phone number associated with the first user device, an email address associated with the first user device, or the like. In some aspects, the first user device may set up an access system including login information (e.g., access information) such as, for example, username, password, or the like to subsequently gain access to the registered account. In some aspects, the first user device may share the login information with other user devices (e.g., second user device) associated with the first user device to enable the other user devices to utilize the login information to gain access to the MSP control infrastructure 104 via the registered account. In some aspects, a given user device may be associated with the first user device because the given user device may be available to a user/owner of the first user device. In some aspects, when the second user device may not be associated with the registered account associated with the first user device, the second user device may register a different account with the MSP control infrastructure 104.

In some aspects, the first user device and the second user device may utilize the login information to access the registered account/accounts to communicate with the MSP control infrastructure 104. As shown by reference numeral 310, based at least in part on the first user device and the second user device accessing the registered account/accounts to communicate with the MSP control infrastructure 104, the MSP control infrastructure 104 may transmit, and the first client application and the second client application may receive, MSP access information. In some aspects, the MSP access information may include UDP access information. The UDP access information may include information regarding an infrastructure UDP IP address and an infrastructure UDP port associated with the MSP control infrastructure 104. The MSP control infrastructure 104 may utilize the infrastructure UDP IP address and the infrastructure UDP port to communicate utilizing the UDP. In some aspects, the first user device and the second user device may utilize the infrastructure UDP IP address and the infrastructure UDP port to communicate with the MSP control infrastructure 104 regarding the mesh network. Further, the first client application and the second client application may obtain from, for example, a domain name services (DNS) server, transmission control protocol (TCP) access information associated with the MSP control infrastructure 104. Such TCP access information may include information regarding an infrastructure TCP IP address and an infrastructure TCP port associated with the MSP control infrastructure 104. The MSP control infrastructure 104 may utilize the infrastructure TCP IP address and the infrastructure TCP port to communicate utilizing the TCP.

As shown by reference numeral 315, the first client application and the second client application may determine information based at least in part on the registration of the account/accounts with the MSP Control Infrastructure 104. In an example, the first client application may determine a first asymmetric assigned key pair associated with the first user device. The first assigned key pair may be unique to the first user device and may include a first assigned public key and a first assigned private key. In this way, the first assigned public key and the first assigned private key may be device-specific and maybe associated with the registered account. In some aspects, the first assigned public key and the first assigned private key may be associated with each other via, for example, a mathematical function. As a result, data encrypted using the first assigned public key may be decrypted by utilizing the first assigned private key.

Similarly, the second client application may determine a second asymmetric assigned key pair associated with the second user device. The second assigned key pair may be unique to the second user device and may include a second assigned public key and a second assigned private key. In this way, the second assigned public key and the second assigned private key may be device-specific and maybe associated with the registered account. In some aspects, the second assigned public key and the second assigned private key may be associated with each other via, for example, a mathematical function. As a result, data encrypted using the second assigned public key may be decrypted by utilizing the second assigned private key.

As shown by reference numeral 320, the client applications may transmit, and the MSP control infrastructure 104 may receive, at least a portion of the information determined by the client applications. For instance, the first client application may transmit the first assigned public key to the MSP control infrastructure 104 and the second client application may transmit the second assigned public key to the MSP control infrastructure 104. The MSP control infrastructure 104 may store and correlate the received information in association with the respective registered accounts and/or with the respective user devices. In some aspects, the first client application and the second client application may utilize the infrastructure TCP IP address and the infrastructure TCP port to transmit the first assigned public key and the second assigned public key to the MSP control infrastructure 104 via the TCP.

Further, as shown by reference numeral 325, the MSP control infrastructure 104 may determine that the first user device and the second user device are to be included in the same mesh network. In some aspects, when the first user device and the second user device are associated with the same registered account, the MSP control infrastructure 104 may make such a determination regarding the secure mesh network based at least in part on determining that the first user device and the second user device are communicating with the MSP control infrastructure 104 by utilizing the login information associated with the same registered account. In some aspects, when the first user device and the second user device are associated with different registered accounts, the MSP control infrastructure 104 may make such a determination regarding the secure mesh network based at least in part on the first user device (or the second user device) providing information indicating that the first user device and the second user device are to be included in the secure mesh network. Such information may include, for example, identification information (e.g., type of device, etc.) associated with the second user device (or the first user device), the second IP address (or the first IP address), or the like.

Based at least in part on determining that the first user device and the second user device are to be included in the same mesh network, as shown by reference numeral 330, the MSP control infrastructure 104 may determine meshnet IP addresses for the first user device and for the second user device. In an example, the MSP control infrastructure 104 may determine a first meshnet IP address associated with the first user device and a second meshnet IP address associated with the second user device. The first client application and/or another application installed on the first user device and/or the operating system associated with the first user device may utilize the first meshnet IP address and/or the first local meshnet port to communicate data with the user devices over meshnet connections in the mesh network and the second user device may utilize the second meshnet IP address and/or the second local meshnet port to communicate data with the user devices over the meshnet connections in the mesh network. In an example, with respect to communication between the first user device and the second user device, the first user device may determine a first meshnet IP packet indicating the first meshnet IP address as a source address, the first local meshnet port as a source port, the second meshnet IP address as a destination address, and the second local meshnet port as a destination port. The first user device may encrypt and encapsulate the first meshnet IP packet within a payload of a transmitted UDP IP packet. The second user device may receive the UDP IP packet, may decrypt the first meshnet IP packet, and may route the first meshnet IP packet to the second local meshnet port. Similarly, the second user device may determine a second meshnet IP packet indicating the second meshnet IP address as a source address, the second local meshnet port as a source port, the first meshnet IP address as a destination address, and the first local meshnet port as a destination port. The second user device may encrypt and encapsulate the second meshnet IP packet within a payload of a transmitted UDP IP packet. The first user device may receive the UDP IP packet, may decrypt the first meshnet IP packet, and may route the second meshnet IP packet to the first local meshnet port. The MSP control infrastructure 104 may determine the first meshnet IP address and the second meshnet IP address from, for example, a pool of reserved IP addresses included in a subnet associated with an internal network of the ISP.

As shown by reference numeral 335, the first user device and the second user device may transmit, and the MSP control infrastructure 104 may receive, respective binding requests. In an example, the first user device may transmit a first binding request to the MSP control infrastructure 104 to request the MSP control infrastructure 104 to determine a first UDP IP address (e.g., communication address) and/or a first UDP port (e.g., communication port) associated with the first device. In some aspects, the first user device may transmit the first binding request to the MSP control infrastructure 104 using the UDP by utilizing the UDP access information received from the MSP control infrastructure 104 (e.g., block 310). As discussed below in further detail, the first UDP IP address and/or the first UDP port are to be utilized by the second user device to communicate with the first user device in the mesh network. Similarly, the second user device may transmit a second binding request to the MSP control infrastructure 104 to request the MSP control infrastructure 104 to determine a second UDP IP address (e.g., communication address) and/or a second UDP port (e.g., communication port) associated with the second device. In some aspects, the second user device may transmit the second binding request to the MSP control infrastructure 104 using the UDP by utilizing the UDP access information received from the MSP control infrastructure 104 (e.g., block 310). As discussed below in further detail, the second UDP IP address and/or the second UDP port are to be utilized by the first user device to communicate with the second user device in the mesh network.

In some aspects, the first UDP IP address and/or the first UDP port may be determined by a first NAT (e.g., a router) device responsible for managing operation of the first user device in a first local network. In an example, the first NAT device may translate a first local UDP IP address and/or a first local UDP port associated with the first user device to the first UDP IP address and/or the first UDP port that the first user device utilizes to publicly communicate (e.g., transmit and/or receive) over the Internet using the UDP. Similarly, the second UDP IP address and/or the second UDP port may be determined by a second NAT device responsible for managing operation of the second user device in a second local network. In an example, the second NAT device may translate a second local UDP IP address and/or a second local UDP port associated with the second user device to the second UDP IP address and/or the second UDP port that the second user device utilized to publicly communicate (e.g., transmit and/or receive) over the Internet using the UDP.

Based at least in part on receiving the respective binding requests, as shown by reference numeral 340, the MSP control infrastructure 104 may determine UDP IP addresses and UDP ports for the first user device and the second user device. In an example, based at least in part on receiving the first binding request, the MSP control infrastructure 104 may determine the first UDP IP address and/or the first UDP port associated with the first user device. In some aspects, the MSP control infrastructure 104 may determine the first UDP IP address and/or the first UDP port based at least in part on analyzing the UDP communication (e.g., UDP IP packet) including the first binding request received from the first user device. The UDP communication may include, for example, a header that indicates the first UDP IP address as a source UDP IP address and/or the first UDP port as a source UDP port associated with the first user device. Similarly, based at least in part on receiving the second binding request, the MSP control infrastructure 104 may determine the second UDP IP address and/or the second UDP port associated with the second user device. In some aspects, the MSP control infrastructure 104 may determine the second UDP IP address and/or the second UDP port based at least in part on analyzing the UDP communication (e.g., UDP IP packet) including the second binding request received from the second user device. The UDP communication may include, for example, a header that indicates the second UDP IP address as a source UDP IP address and/or the second UDP port as a source UDP port associated with the second user device.

Based at least in part on determining the UDP IP addresses and/or the UDP ports, as shown by reference numeral 345, the MSP control infrastructure 104 may transmit, and the first client application and the second client application may receive, communication information. In an example, the MSP control infrastructure 104 may transmit, and the first client application may receive, first communication information including the first meshnet IP address associated with the first user device, the second meshnet IP address associated with the second user device, the first UDP IP address and the first UDP port associated with the first user device, the second UDP IP address and the second UDP port associated with the second user device, and/or the second public key associated with the second user device. Further, the first client application may store information associated with the first UDP IP address and/or the first UDP port in a memory associated with the first user device. Similarly, the MSP control infrastructure 104 may transmit, and the second client application may receive, second communication information including the first UDP IP address and the first UDP port associated with the first user device, the second UDP IP address and the second UDP port associated with the second user device, the first public key associated with the first user device, the first meshnet IP address associated with the first user device, and/or the second meshnet IP address associated with the second user device. Further, the second client application may store information associated with the second UDP IP address and/or the second UDP port in a memory associated with the second user device. As discussed below in further detail, the above transmission of communication information may enable the first user device and the second user device to communicate securely and privately in the mesh network.

As shown by reference numeral 350, the first user device and the second user device may communicate with each other directly to set up a meshnet connection (e.g., an encrypted tunnel) for communicating encrypted data in the hybrid mesh network. To set up the meshnet connection, the first client application may utilize the second assigned public key and/or the second public IP address (e.g., second UDP IP address) to securely (e.g., in encrypted form) communicate with the second user device, and the second client application may utilize the first assigned public key and/or the first public IP address (e.g., first UDP IP address) to securely communicate with the first user device. In some aspects, the first user device and the second user device may communicate to securely/privately negotiate parameters (e.g., a symmetric encryption/decryption key) associated with the meshnet connection. In some aspects, the parameters may be randomly generated to provide optimized security to the communications. In an example, the first user device and the second user device may privately negotiate a randomly generated symmetric key that is to be utilized by the first user device and the second user device for encrypting and decrypting data communicated via the meshnet connection. The randomly generated symmetric key may be determined based at least in part on any combination of the first public key, the second public key, and/or randomly generated numbers. Additionally, the first user device and the second user device may utilize a secure protocol (e.g., Wireguard, IP sec, etc.) to communicate the data via the meshnet connection.

Additionally, or alternatively, the first user device and the second user device may communicate with each other indirectly via, for example, a relay device (e.g., a relay server) to set up the meshnet connection. In an example, the first user device may provide the first assigned public key to a relay server, which may store an association of the first assigned public key with the first user device. In some aspects, the association may include an association between the first assigned public key and a first communication connection between the relay server and the first user device. Similarly, the second user device may provide the second assigned public key to the relay server, which may store an association of the second assigned public key with the second user device. In some aspects, the association may include an association between the second assigned public key and a second communication connection between the relay server and the first user device. The relay server may rely on the stored associations of public keys and user devices to determine a destination of a received message. In some aspects, the relay server may include a network of relay servers that enable the first user device and the second user device to communicate with each other. In this case, the first user device and the second user device may provide the respective assigned public keys to different relay servers included within the network of relay servers.

In some aspects, the first client application may transmit, to the relay server, a first message that is to be delivered to the second user device. Along with the first message, the first client application may transmit the second assigned public key. Further, the first client application may encrypt the first message utilizing the second assigned public key. In some aspects, the first client application may encrypt the first message based at least in part on utilizing the negotiated randomly generated symmetric key. Based at least in part on receiving the encrypted first message and the second assigned public key, the relay server may determine from stored associations that the second assigned public key is associated with the second user device. As a result, the relay server may determine that the first message is to be relayed (e.g., transmitted) to the second user device. Similarly, the second client application may transmit, to the relay server, a second message that is to be delivered to the first user device. Along with the second message, the second client application may transmit the first assigned public key. Further, the second client application may encrypt the second message utilizing the first assigned public key. In some aspects, the second client application may encrypt the second message based at least in part on utilizing the negotiated randomly generated symmetric key. Based at least in part on receiving the encrypted second message and the first assigned public key, the relay server may determine from stored associations that the first assigned public key is associated with the first user device. As a result, the relay server may determine that the second message is to be relayed (e.g., transmitted) to the first user device. In this way, the relay server may enable the first user device and the second user device to communicate with each other to set up the meshnet connection.

Based at least in part on setting up the meshnet connection, the first client application and the second client application may begin communicating encrypted data via the meshnet connection based at least in part on utilizing the negotiated parameters and the secure protocol. In a similar and/or analogous manner, the first client application may set up meshnet connections with a third client application installed in the third user device and with a fourth client application associated with the fourth user device. Also, in a similar and/or analogous manner, the second client application may set up meshnet connections with the first client application, the third client application, and the fourth client application. Further, in a similar and/or analogous manner, the third client application may set up meshnet connections with the first client application, the second client application, and the fourth client application. Finally, in a similar and/or analogous manner, the fourth client application may set up meshnet connections with the first client application, the second client application, and the third client application. Additional user devices that enter the mesh network may also set up meshnet connections with the other user devices included in the mesh network.

In a similar and/or analogous manner, the first and third meshnet devices may set up a meshnet connection therebetween. Also, in a similar and/or analogous manner, the second and third meshnet devices may set up a meshnet connection therebetween. Additional meshnet devices that enter the mesh network may also set up meshnet connections with the other meshnet devices included in the mesh network in a similar and/or analogous manner.

Based at least in part on setting up the mesh net connections, each of the first user device, the second user device, the third user device, and/or the fourth user device (collectively, "the user devices") may operate as an entry device by selecting another user device in the mesh network as an exit device. In some aspects, selecting an exit device may include the user device selecting an initial exit device (e.g., for the first time) and/or the user device selecting a new exit device to replace a previously selected exit device.

In an example, when the first user device selects the second user device as an exit device, the first user device may operate as a direct entry device with respect to the second user device and the second user device may operate as a direct exit device with respect to the first user device. Also, the third user device may select the first user device as an exit device. Correspondence between the third user device and an external device may be routed via the first user device. Because correspondence between the first user device and an external device is routed via the second user device, the first user device may route the correspondence between the third user device and the external device via the second user device. As a result, the correspondence between the third user device and the external device may be routed via the first user device and via the second user device. In this case, the third user device may operate as a direct entry device with respect to the first user device and as an indirect entry device with respect to the second user device, and the first user device may operate as a direct exit device with respect to the third user device and the second user device may operate as an indirect exit device with respect to the third user device. Similarly, the fourth user device may select the third user device as an exit device. Correspondence between the fourth user device and an external device may be routed via the third user device. Because correspondence between the third user device and an external device is routed via the first user device, the third user device may route the correspondence between the fourth user device and the external device via the first user device. As a result, the correspondence between the third user device and the external device may be routed via the third user device and via the first user device. In this case, the fourth user device may operate as a direct entry device with respect to the third user device and as an indirect entry device with respect to the first user device, and the third user device may operate as a direct exit device with respect to the fourth user device and the first user device may operate as an indirect exit device with respect to the fourth user device. Additionally, the second user device may operate as an indirect exit device with respect to the third user device and the fourth user device, and the third user device and the fourth user device may operate as indirect entry devices with respect to the second user device.

Sharing of DNS resources between the first user device and the second user device will now be discussed. The present disclosure contemplates all user devices in the mesh network to be able to operate in a similar and/or analogous manner as the first user device and/or the second user device for sharing DNS resources. Further, the present disclosure contemplates all user devices to be able to operate as direct entry devices, direct exit devices, indirect entry devices, and/or indirect exit devices while sharing DNS resources.

As shown by reference numeral 355, the first user device and the second user device (and all other user devices) in the mesh network may share DNS resources. In some aspects, the first user device may select to operate as the entry device with the second user device operating as the exit device. In this case, all communication between the first user device and an external device, outside the mesh network, may be communicated via the second user device.

Initially, the first user device and/or the second user device may selectively transmit respective status messages indicating operation of the first user device and/or the second user device as entry devices and/or exit devices. In some aspects, a user device may transmit a respective status message periodically (e.g., every 10 seconds, every 20 seconds, every 30 seconds, every 60 seconds, every 120 seconds, etc.). Additionally, or alternatively, the user device may transmit the respective status message when the user device selects an exit device. In some aspects, selecting an exit device may include the user device selecting an initial exit device (e.g., for the first time) and/or the user device selecting a new exit device to replace a previously selected exit device.

Based at least in part on establishing the meshnet connections, the first user device may select the second user device as an exit device. In this case, the first user device may select to transmit a first status message to all user devices in the mesh network. The first status message may indicate that the first user device has selected the second user device as an exit device. Based at least in part on receiving and/or analyzing the first status message, all user devices in the mesh network may determine that the first user device is operating as a direct entry device with respect to the second user device such that all communication between the first user device and an external device, outside the mesh network, is routed via the second user device. All user devices may store the determined information in respective memories associated with the user devices.

With respect to the second user device, the second user device may select to not transmit a second status message because the second user device has not yet selected an exit device. Based at least in part on failing to receive the second status message, all user devices may determine that the second user device is currently not operating as an entry device.

Further, based at least in part on establishing the meshnet connections, the first user device and/or the second user device (and all other user devices in the mesh network) may share DNS information with all user devices in the mesh network. In an example, because the first user device is associated with the first LAN, the first user device may share first DNS information indicating first access information (e.g., first subnet IP address assigned to the first DNS server) utilized by devices associated with the first LAN to access the first DNS server. All user devices in the mesh network may store the first DNS information in respective memories associated with the user devices. Similarly, because the second user device is associated with the second LAN, the second user device may share second DNS information indicating second access information (e.g., second subnet IP address assigned to the second DNS server) utilized by devices associated with the second LAN to access the second DNS server. All user devices in the mesh network may store the second DNS information in respective memories associated with the user devices.

When the first user device is to communicate with the external device, the first user device may determine the domain information associated with the external device. In this case, the first user device may refer to all status information and/or DNS information stored in the respective memory associated with the first user device. In an example, the first user device may determine that the second user device is currently not operating as an entry device. Further, the first user device may determine that the second user device may utilize second access information to access the second DNS server.

Aspect 1

Based at least in part on determining that the second user device is currently not operating as an entry device and/or that the second user device may utilize the second access information to access the second DNS server, the first user device may determine a meshnet query packet to be transmitted to the second user device over the meshnet connection between the first user device and the second user device. The meshnet query packet may be encrypted based at least in part on utilizing the cryptographic key (e.g., block 350) negotiated between the first user device and the second user device.

In some aspects, the meshnet query packet may include a meshnet query header, which indicates the first meshnet IP address (associated with the first user device) as a source address to indicate that the meshnet query packet is transmitted by the first user device. Further, the meshnet query header may indicate the second meshnet IP address as a destination address to indicate that the meshnet query packet is to be received by the second user device.

The meshnet query packet may also include a meshnet query payload. In the meshnet query payload, the first user device may include a DNS query packet to be transmitted to the second DNS server. The DNS query packet may include a DNS query header indicating the first meshnet IP address as the source address to indicate that the DNS query packet is transmitted by the first user device. Further, the DNS query header may indicate the second access information (e.g., second subnet IP address assigned to the second DNS server by the second LAN) as the destination address to indicate that the DNS query packet is to be received by the second DNS server. The DNS query packet may also include a DNS query payload with query information (e.g., domain name, etc.) to be received by the second DNS server to enable the DNS server to obtain the domain information associated with the external device.

Based at least in part on receiving the encrypted meshnet query packet over the meshnet connection, the second user device may utilize the negotiated cryptographic key to decrypt the encrypted meshnet query packet. The second user device may determine, based at least in part on analyzing the meshnet query header, that the meshnet query packet is transmitted by the first user device and is to be received by the second user device.

Further, based at least in part on analyzing the meshnet query payload, the second user device may determine the DNS query packet. Based at least in part on analyzing the DNS query header included in the DNS query packet, the second user device may determine the second access information as the destination address. In this case, the second user device may determine that the DNS query packet is to be transmitted to the second DNS server.

In this case, the second user device may determine a modified DNS query packet by modifying the DNS query header in the DNS query packet to indicate the subnet IP address assigned to the second user device by the second LAN as the source address. Further, the second user device may transmit the modified DNS query packet to the second DNS server. In some aspects, the second user device may utilize a subnet IP address assigned to the second user device in the second LAN along with the second access information to transmit the modified DNS query packet over a second LAN connection.

In some aspects, the second DNS server may receive the DNS query packet and may determine the query information included in the DNS query payload. In some aspects, the query information may indicate that the second DNS server is to obtain the domain information (e.g., IP address) associated with the external device. Further, the query information may indicate that the DNS query packet was originally determined and/or transmitted by the first user device. Based at least in part on determining the query information, the second DNS server may resolve the query information to obtain the domain information associated with the external device.

Based at least in part on determining the domain information, the second DNS server may transmit, and the second user device may utilize the subnet IP address assigned to the second user device to receive a DNS response packet over the second LAN connection. In some aspects, the DNS response packet may be received within a given duration of time (e.g., 60 seconds, 120 seconds, 300 seconds, etc.) after transmitting the modified DNS query packet.

The DNS response packet may include a DNS response header indicating the second access information assigned to the second DNS server as the source address and indicating the subnet IP address assigned by the second LAN to the second user device as the destination address. Further, the DNS response packet may include a DNS response payload including information indicating the obtained domain information associated with the external device. Further, the DNS response payload may include information indicating that the DNS response payload is to be transmitted to the first user device that originally determined and/or transmitted the DNS query packet. In some aspects, the second user device may determine that the DNS response payload is to be transmitted to the first user device based at least in part on receiving the DNS response packet within the given duration of time.

In this case, the second user device may determine a meshnet response packet including a meshnet response header indicating the second meshnet IP address of the second user device as the source address and indicating the first meshnet IP address of the first user device as the destination address. The meshnet response packet may also include a meshnet response payload including the information included in the DNS response payload received from the second DNS server. The second user device may transmit the meshnet response packet to the first user device over the meshnet connection between the second user device and the first user device. In some aspects the meshnet response packet may be encrypted based at least in part on utilizing the cryptographic key (e.g., block 350) negotiated between the first user device and the second user device.

Based at least in part on receiving the encrypted meshnet response packet, the first user device may utilize the negotiated cryptographic key to decrypt the encrypted meshnet response packet. The first user device may determine, based at least in part on analyzing the meshnet response header, that the meshnet response packet is transmitted by the second user device and is to be received by the first user device. Further, based at least in part on analyzing the meshnet response payload, the first user device may determine the domain information associated with the external device.

Based at least in part on receiving the domain information, the first user device may communicate with the external device. For instance, the first user device may determine a meshnet initiation packet to be transmitted to the second user device over the meshnet connection between the first user device and the second user device. The meshnet initiation packet may be encrypted based at least in part on utilizing the cryptographic key (e.g., block 350) negotiated between the first user device and the second user device.

In some aspects, the meshnet initiation packet may include a meshnet initiation header, which may indicate the first meshnet IP address (associated with the first user device) as a source address to indicate that the meshnet initiation packet is transmitted by the first user device. Further, the meshnet initiation header may indicate the second meshnet IP address as a destination address to indicate that the meshnet initiation packet is to be received by the second user device.

The meshnet initiation packet may also include a meshnet initiation payload. In the meshnet initiation payload, the first user device may include a network initiation packet (e.g., network communication) to be transmitted to the external device. The network initiation packet may include a network initiation header indicating the first meshnet IP address as the source address to indicate that the network initiation packet is transmitted by the first user device. Further, the network initiation header may indicate the domain information (e.g., IP address) of the external device as the destination address to indicate that the network initiation packet is to be received by the external device. The network initiation packet may also include a network initiation payload including communication information to be received and processed by the external device and/or information indicating that the network initiation packet was originally determined and/or transmitted by the first user device. In some aspects, the external device may process the communication information by, for example, accepting the communication information, analyzing the communication information, or responding to the communication information.

Based at least in part on receiving the encrypted meshnet initiation packet over the meshnet connection, the second user device may utilize the negotiated cryptographic key to decrypt the encrypted meshnet initiation packet. The second user device may determine, based at least in part on analyzing the meshnet initiation header, that the meshnet initiation packet is transmitted by the first user device and is to be received by the second user device.

Further, based at least in part on analyzing the meshnet initiation payload, the second user device may determine the network initiation packet and the network initiation header included therein. Based at least in part on analyzing the network initiation header, the second user device may determine the domain information associated with the external device as the destination address. In this case, the second user device may determine that the network initiation packet is to be transmitted to the external device outside the mesh network.

The second user device may determine a modified network initiation packet by modifying the network initiation header in the network initiation packet to indicate the public IP address associated with the second user device as the source address. Also, the second user device may modify the network initiation header to indicate the domain information associated with the external device as the destination address. Further, the second user device may utilize the domain information to transmit the modified network initiation packet to the external device. In some aspects, the second user device may utilize a network connection (e.g., Internet, LAN/WAN, etc.) to transmit the modified network initiation packet to the external device.

In some aspects, the external device may receive the network initiation packet and may determine the communication information included in the network initiation payload. Further, the communication information may indicate that the network initiation packet was originally determined and/or transmitted by the first user device. Based at least in part on receiving the communication information, the external device may process the communication information.

Based at least in part on processing the communication information, the external device may transmit, and the second user device may receive, a network response packet. In some aspects, the network response packet may be received within a given duration of time (e.g., 60 seconds, 120 seconds, 300 seconds, etc.) after transmitting the modified network initiation packet.

The network response packet may include a network response header indicating the domain information associated with the external device as the source address and indicating the public IP address associated with the second user device as the destination address. Further, the network response packet may include a network response payload including a response to the communication information. In some aspects, the network response payload may also include information indicating that the network response payload is to be transmitted to the first user device that originally determined and/or transmitted the network initiation packet. In some aspects, the second user device may determine that the network response payload is to be provided to the first user device based at least in part on receiving the network response packet within the given duration of time.

In this case, the second user device may determine a meshnet response packet including a meshnet response header indicating the second meshnet IP address of the second user device as the source address and indicating the first meshnet IP address of the first user device as the destination address. The meshnet response packet may include a meshnet response payload including the network response payload received from the external device. The second user device may transmit the meshnet response packet to the first user device over the meshnet connection between the second user device and the first user device. The meshnet response packet may be encrypted based at least in part on utilizing the cryptographic key (e.g., block 350) negotiated between the first user device and the second user device.

Based at least in part on receiving the encrypted meshnet response packet, the first user device may utilize the negotiated cryptographic key to decrypt the encrypted meshnet response packet. The first user device may determine, based at least in part on analyzing the meshnet response header, that the meshnet response packet is transmitted by the second user device and is to be received by the first user device. Further, based at least in part on analyzing the meshnet response payload, the first user device may determine the network response payload (e.g., response to the communication information) transmitted by the external device via the second user device. In this way, the second user device may enable the first user device, that does not have access to the second DNS server, to communicate with the external device based at least in part on utilizing the second DNS server to obtain the domain information associated with the external device.

In some aspects, the meshnet query packet may be included within a network query packet and the meshnet response packet may be included within the network response packet, as discussed below in further detail. In this case, in some aspects, the meshnet query payload may include the query information to be received by the second DNS server to enable the DNS server to obtain the domain information associated with the external device.

In a similar and/or analogous manner as discussed above with respect to the second user device enabling the first user device to communicate with the external device based at least in part on utilizing the second DNS server, the present disclosure contemplates any user device in the mesh network enabling another device in the mesh network to communicate with an external device.

Aspect 2

Based at least in part on determining that the second user device may utilize the second access information (e.g., second subnet IP address assigned to the second DNS server) to access the second DNS server, the first user device may determine a network query packet to be transmitted to the second user device.

In some aspects, the network query packet may include a network query header, which indicates the first public IP address (e.g., UDP IP address associated with the first user device) as a source address to indicate that the network query packet is transmitted by the first user device. Further, the network query header may indicate the second public IP address (e.g., UDP IP address associated with the second user device) as a destination address to indicate that the network query packet is to be received by the second user device.

The network query packet may also include a network query payload. In the network query payload, the first user device may include a meshnet query packet to be received by the second user device. The meshnet query packet may be encrypted based at least in part on utilizing the cryptographic key (e.g., block 350) negotiated between the first user device and the second user device.

The meshnet query packet may include a meshnet query header indicating the first meshnet IP address as the source address to indicate that the meshnet query packet is transmitted by the first user device. Further, the meshnet query header may indicate the second access information (e.g., second subnet IP address assigned to the second DNS server by the second LAN) as the destination address to indicate that the second user device is to forward the meshnet query packet to the second DNS server. The meshnet query packet may also include a meshnet query payload with query information (e.g., domain name, etc.) to be received by the second DNS server to enable the second DNS server to obtain the domain information (e.g., IP address) associated with the external device. The first user device may transmit the network query packet including the meshnet query packet to the second user device.

Based at least in part on receiving the network query packet, the second user device may analyze the network query header and/or payload to determine that the network query packet is transmitted by the first user device and is to be received by the second user device. Further, based at least in part on analyzing the network query payload, the second user device may receive the encrypted meshnet query packet.

The second user device may utilize the cryptographic key (e.g., block 350) negotiated between the first user device and the second user device to decrypt the encrypted meshnet query packet. Based at least in part on decrypting the encrypted meshnet query packet, the second user device may determine the meshnet query header and the meshnet query payload. The second user device may analyze the meshnet query header to determine that the second access information, associated with the second DNS server, is the destination address. In this case, the second user device may determine that the query information included in the meshnet query payload is to be transmitted to the second DNS server.

In this case, the second user device may modify the meshnet query packet to determine a LAN query packet that is to be transmitted to the second DNS server. In some aspects, the second user device may modify the meshnet query header to determine a LAN query header. In the LAN query header, the second user device may indicate the subnet IP address assigned to the second user device by the second LAN as the source address, and allow the second access information (e.g., second subnet IP address assigned to the second DNS server by the second LAN) to be indicated as the destination address. Further, the second user device may determine a LAN query payload based at least in part on the meshnet query payload. In the LAN query payload, the second user device may include the query information to be received by the second DNS server to enable the second DNS server to obtain the domain information associated with the external device.

The second user device may transmit the LAN query packet to the second DNS server. In some aspects, the second user device may utilize a subnet IP address assigned to the second user device in the second LAN along with the second access information to transmit the LAN query packet over a second LAN connection to the second DNS server. Further, the second user device may locally store, for a temporary duration of time (e.g., 30 seconds, 60 seconds, 120 seconds, etc.) transmission information associated with the LAN query packet transmitted to the second DNS server. Such transmission information may include source and/or destination information indicated by the LAN query header. In some aspects, when the second user device receives a LAN response packet from the second DNS server within the temporary duration of time, the second user device may determine that the second DNS server has transmitted the LAN response packet in response to the LAN query packet. In some aspects, the second user device may determine whether one or more header fields have been updated in the LAN response packet based at least in part on checking, for example, a checksum associated with the LAN response packet.

In some aspects, the second DNS server may receive the LAN query packet and may determine the included LAN query header and/or the LAN query payload. In some aspects, the LAN query header and/or the LAN query payload may indicate that the second DNS server is to obtain the domain information associated with the external device. Further, the LAN query header and/or the LAN query payload may indicate that the query information was originally determined and/or transmitted by the first user device. The second DNS server may determine the query information and resolve to obtain the domain information associated with the external device.

Based at least in part on obtaining the domain information, the second DNS server may determine a LAN response packet. The LAN response packet may include a LAN response header indicating the second access information assigned to the second DNS server as the source address and indicating the subnet IP address assigned to the second user device as the destination address. The LAN response packet may also include a LAN response payload including information indicating the obtained domain information associated with the external device. Further, the LAN response payload may include information indicating that the LAN response payload is to be transmitted to the first user device that originally determined and/or transmitted the query information.

The second DNS server may transmit, and the second user device may utilize the subnet IP address assigned to the second user device to receive the LAN response packet over the second LAN connection. The second user device may determine that the LAN response payload is to be transmitted to the first user device. In an example, the LAN response packet may be received within a given duration of time (e.g., 60 seconds, 120 seconds, 300 seconds, etc.) after transmitting the LAN query packet. In this case, the second user device may determine that the LAN response payload is to be transmitted to the first user device based at least in part on receiving the LAN response packet within the given duration of time (e.g., in response to the LAN query packet). In another example, the second user device may determine that the LAN response payload is to be transmitted to the first user device based at least in part on the information in the LAN response payload indicating that the LAN response payload is to be transmitted to the first user device that originally determined and/or transmitted the query information.

In this case, the second user device may determine a network response packet to be transmitted to the first user device. In some aspects, the network response packet may include a network response header, which indicates the second public IP address (e.g., UDP IP address associated with the second user device) as a source address to indicate that the network response packet is transmitted by the second user device. Further, the network response header may indicate the first public IP address (e.g., UDP IP address associated with the first user device) as a destination address to indicate that the network response packet is to be received by the first user device.

The network response packet may also include a network response payload. In the network response payload, the second user device may include a meshnet response packet including a meshnet response header indicating the second meshnet IP address of the second user device or the second subnet IP address assigned to the second DNS server as the source address and indicating the first meshnet IP address of the first user device as the destination address. The meshnet response packet may also include a meshnet response payload including the information included in the LAN response payload received from the second DNS server.

The second user device may transmit the network response packet including the meshnet response packet to the first user device. In some aspects the meshnet response packet may be encrypted based at least in part on utilizing the cryptographic key (e.g., block 350) negotiated between the first user device and the second user device.

Based at least in part on receiving the network response packet, the first user device may analyze the network response header and/or payload to determine that the network response packet is transmitted by the second user device and is to be received by the first user device. Further, based at least in part on analyzing the network response payload, the first user device may receive the encrypted meshnet response packet.

Based at least in part on receiving the encrypted meshnet response packet, the first user device may utilize the negotiated cryptographic key to decrypt the encrypted meshnet response packet. The first user device may determine, based at least in part on analyzing the meshnet response header, that the meshnet response packet is transmitted by the DNS server through the second user device and is to be received by the first user device. Further, based at least in part on analyzing the meshnet response payload, the first user device may determine the domain information associated with the external device.

Based at least in part on receiving the domain information, the first user device may communicate with the external device. For instance, the first user device may determine a network initiation packet to be transmitted to the second user device. The network initiation packet may include a network initiation header, which indicates the first public IP address (e.g., UDP IP address associated with the first user device) as a source address to indicate that the network initiation packet is transmitted by the first user device. Further, the network initiation header may indicate the second public IP address (e.g., UDP IP address associated with the second user device) as a destination address to indicate that the network initiation packet is to be received by the second user device.

The network initiation packet may also include a network initiation payload. In the network initiation payload, the first user device may include a meshnet initiation packet to be received by the second user device. The meshnet initiation packet may be encrypted based at least in part on utilizing the cryptographic key (e.g., block 350) negotiated between the first user device and the second user device.

The meshnet initiation packet may include a meshnet initiation header indicating the first meshnet IP address as the source address to indicate that the meshnet initiation packet is transmitted by the first user device. Further, the meshnet initiation header may indicate the domain information (e.g., IP address) of the external device as the destination address to indicate that the second user device is to forward the meshnet initiation packet to the external device. The meshnet initiation packet may also include a meshnet initiation payload including communication data (e.g., file, text message, audio, video, or a combination thereof) to be received and processed by the external device. The communication data may include information indicating that the communication data was originally determined and/or transmitted by the first user device. In some aspects, the external device may process the communication data by accepting the communication data, analyzing the communication data, and responding to the communication data.

Based at least in part on receiving the network initiation packet, the second user device may analyze the network initiation header and/or payload to determine that the network initiation packet is transmitted by the first user device and is to be received by the second user device. Further, based at least in part on analyzing the network initiation payload, the second user device may determine the encrypted meshnet initiation packet.

The second user device may utilize the cryptographic key (e.g., block 350) negotiated between the first user device and the second user device to decrypt the encrypted meshnet initiation packet. Based at least in part on decrypting the encrypted meshnet initiation packet, the second user device may determine the meshnet initiation header and the meshnet initiation payload. The second user device may analyze the meshnet initiation header to determine that the domain information, associated with the external device, is the destination address. In this case, the second user device may determine that the communication data included in the meshnet initiation payload is to be transmitted to the external device.

In this case, the second user device may modify the meshnet initiation packet to determine a communication initiation packet that is to be transmitted to the external device. In some aspects, the second user device may modify the meshnet initiation header to determine a communication initiation header. In the communication initiation header, the second user device may indicate the public IP address (e.g., UDP IP address) assigned to the second user device (or the subnet IP address of the second user device if the external device is included in the second LAN) as the source address, and allow the domain information associated with the external device to be indicated as the destination address. Further, the second user device may determine a communication initiation payload. In the communication initiation payload, the second user device may include the communication data to be received and/or processed by the external device.

Further, the second user device may transmit the communication initiation packet to the external device over the open Internet (or over a second LAN connection if the external devices are included in the second LAN). The second user device may locally store, for a temporary duration of time (e.g., 30 seconds, 60 seconds, 120 seconds, etc.) transmission information associated with transmitting the communication initiation packet to the external device. Such transmission information may include source and/or destination information indicated by the communication initiation header. In some aspects, when the second user device receives a communication response packet from the external device within the temporary duration of time, the second user device may determine that the external device has transmitted the communication response packet in response to the communication initiation packet. In some aspects, the second user device may determine whether one or more header fields have been updated in the communication response packet based at least in part on checking, for example, a checksum associated with the communication response packet.

In some aspects, the external device may receive the communication initiation packet and may determine the included communication initiation header and/or the communication initiation payload. The communication initiation header and/or the communication initiation payload may indicate the communication data to be received and/or processed by the external device. Further, the communication initiation header and/or the communication initiation payload may indicate that the communication data was originally determined and/or transmitted by the first user device. The external device may process the communication data.

Based at least in part on processing the communication data, the external device may determine a communication reply packet. The communication reply packet may include a communication reply header indicating the domain information associated with the external device as the source address and indicating the public IP address associated with the second user device (or the subnet IP address assigned to the second user device if the external devices included in the second LAN) as the destination address. The communication reply packet may also include a communication reply payload including response data determined based at least in part on processing the communication data. Further, the communication reply payload may include information indicating that the communication reply payload is to be transmitted to the first user device that originally determined and/or transmitted the communication data.

The external device may transmit, and the second user device may utilize the public IP address associated with the second user device (or the subnet IP address assigned to the second user device) to receive the communication reply packet over the open Internet (or over the second LAN connection). The second user device may determine that the communication reply payload is to be transmitted to the first user device. In an example, the communication reply packet may be received within the temporary duration of time (e.g., 30 seconds, 60 seconds, 120 seconds, 300 seconds, etc.) after transmitting the communication initiation packet. In this case, the second user device may determine that the communication reply payload is to be transmitted to the first user device based at least in part on receiving the communication reply packet within the temporary duration of time (e.g., in response to the communication initiation packet). In some aspects, the second user device may determine that the communication reply payload is to be transmitted to the first user device based at least in part on the response information in the communication reply payload indicating that the communication reply payload is to be transmitted to the first user device that originally determined and/or transmitted the communication data.

In this case, the second user device may determine a network reply packet to be transmitted to the first user device. In some aspects, the network reply packet may include a network reply header, which indicates the second public IP address (e.g., UDP IP address associated with the second user device) as a source address to indicate that the network reply packet is transmitted by the second user device. Further, the network reply header may indicate the first public IP address (e.g., UDP IP address associated with the first user device) as a destination address to indicate that the network reply packet is to be received by the first user device.

The network reply packet may also include a network reply payload. In the network reply payload, the second user device may include a meshnet reply packet including a meshnet reply header indicating the second meshnet IP address of the second user device or the domain information associated with the external device as the source address and indicating the first meshnet IP address of the first user device as the destination address. The meshnet reply packet may also include a meshnet reply payload including the information included in the communication reply payload received from the external device.

The second user device may transmit the network reply packet including the meshnet reply packet to the first user device. In some aspects, the first user device may analyze the meshnet reply header to determine that the meshnet reply packet is originally transmitted by the external device, is forwarded by the second user device, and is to be received by the first user device. In some aspects the meshnet reply packet may be encrypted based at least in part on utilizing the cryptographic key (e.g., block 350) negotiated between the first user device and the second user device.

Based at least in part on receiving the encrypted meshnet reply packet, the first user device may utilize the negotiated cryptographic key to decrypt the encrypted meshnet reply packet. The first user device may determine, based at least in part on analyzing the meshnet reply header, that the meshnet reply packet is transmitted/forwarded by the second user device and is to be received by the first user device. Further, based at least in part on analyzing the meshnet reply payload, the first user device may determine the response data determined by the external device.

In some aspects, a meshnet packet transmitted from the first user device is received by the second user device even when the destination address in the meshnet packet is that of the DNS server or of the external device because the second user device is the exit node with respect to the first user device. The meshnet application in the first user device determines that the destination of the packet is a device external to the mesh network, and therefore adds the destination address of the second DNS server or of the external device within the meshnet packet itself.

In a similar and/or analogous manner as discussed above with respect to the second user device enabling the first user device to communicate with the external device based at least in part on utilizing the second DNS server, the present disclosure contemplates any user device in the mesh network enabling another device in the mesh network to communicate with an external device.

In some aspects, during meshnet communication with the first user device, the second user device may select the third user device as an exit device. In this case, the second user device may select to transmit a second status message to all user devices in the mesh network. The second status message may indicate that the second user device has selected the third user device as an exit device. Based at least in part on receiving and/or analyzing the second status message, all user devices in the mesh network may determine that the second user device is operating as a direct entry device with respect to the third user device such that all communication between the second user device and an external device, outside the mesh network, is routed via the third user device. All user devices may store the determined information in respective memories associated with the user devices.

When the first user device is to communicate with the external device, the first user device may determine that the second user device is currently operating as an entry device with respect to the third user device and/or that the third user device may utilize the third access information (e.g., third subnet IP address assigned to the third DNS server by a third LAN) to access the third DNS server. In this case, the first user device may include the third access information in the DNS query header. The second user device and the third user device may modify the meshnet packets and/or network packets, in an analogous and/or similar manner as discussed above, for transmission of the DNS query and/or the communication information from the first user device to the second user device to the third user device to the DNS server and/or external device, and for transmission of the domain information and/or the response to the communication information from the DNS server and/or external device to the third user device to the second user device to the first user device.

In an example, first user device may transmit the meshnet query packet to the second user device, the second user device may transmit the meshnet query packet to the third user device based at least in part on the included third access information (e.g., second user device may compare the third access information with access information stored in the memory associated with the second user device), the third user device may utilize the third access information to obtain the domain information from the third DNS server, the third user device may transmit the domain information to the second user device indicating that the domain information is to be received by the first user device, the second user device may transmit the domain information to the first user device, the first user device may transmit the network initiation packet including the domain information to the second user device, the second user device may determine that the network initiation packet is to be transmitted to the external device and may transmit the network initiation packet to the third user device, and the third user device may transmit the network initiation packet to the external device based at least in part on the included domain information. As a result, the third user device may receive the network response packet from the external device, the third user device may transmit the network response packet to the second user device indicating that the network response packet is to be received by the first user device, and the second user device may transmit the network response packet to the first user device.

By sharing the DNS resources as discussed above, the user devices in the mesh network may avoid accessing a public DNS server for querying the domain information associated with the external device. As a result, the user devices may mitigate instances of private information associated with the user devices becoming compromised. Additionally, the user devices may avoid introducing a delay in obtaining the domain information associated with the external device. In this way, the MSP control infrastructure and the respective client applications installed on the user device may enable efficient utilization of user device resources (e.g., processing resources, memory resources, power consumption resources, battery life, or the like) and network resources (computational resources, network bandwidth, management resources, processing resources, memory resources, or the like) for suitable tasks associated with the mesh network.

As indicated above, FIG. 3 is provided as an example. Other examples may differ from what is described with regard to FIG. 3.

FIG. 4 is an illustration of an example process 400 associated with sharing DNS resources in a mesh network, according to various aspects of the present disclosure. In some aspects, the process 400 may be performed by a memory and/or a processor/controller (e.g., processing unit 116, processor 720) associated with a first user device (e.g., user device 102) and/or a second user device (e.g., user device 102) executing respective client applications. In some aspects, the first user device and the second user device may be in communication with each other via a meshnet connection, the second user device being connected to a local area network (LAN) that includes a domain name service (DNS) server. As shown by reference numeral 410, process 400 may include the first user device transmitting, to the second user device over the meshnet connection, a meshnet query packet that includes a DNS query packet querying for domain information associated with an external device that is outside the mesh network, the DNS query packet including access information associated with the DNS server to indicate that the second user device is to utilize the DNS server in the LAN to obtain the domain information. For instance, the first user device may utilize an associated communication interface (e.g., communication interface 770) the associated memory and/or processor to transmit, to the second user device over the meshnet connection, a meshnet query packet that includes a DNS query packet querying for domain information associated with an external device that is outside the mesh network, the DNS query packet including access information associated with the DNS server to indicate that the second user device is to utilize the DNS server in the LAN to obtain the domain information, as discussed elsewhere herein.

As shown by reference numeral 420, process 400 may include the second user device transmitting, over a LAN connection, the DNS query packet to the DNS server, and receiving, over the LAN connection based at least in part on transmitting the DNS query packet, the domain information from the DNS server. For instance, the second user device may utilize an associated communication interface, memory, and/or processor to transmit, over a LAN connection, the DNS query packet to the DNS server, and to receive, over the LAN connection based at least in part on transmitting the DNS query packet, the domain information from the DNS server, as discussed elsewhere herein.

As shown by reference numeral 430, process 400 may include the second user device transmitting, to the first user device over the meshnet connection, the domain information associated with the external device. For instance, the second user device may utilize the associated communication interface, memory, and/or processor to transmit, to the first user device over the meshnet connection, the domain information associated with the external device, as discussed elsewhere herein.

As shown by reference numeral 440, process 400 may include the first user device transmitting, to the second user device over the meshnet connection, a meshnet initiation packet that includes a network initiation packet for communicating with the external device, the network initiation packet including the domain information. For instance, the first user device may utilize the associated communication interface, memory, and/or processor to transmit, to the second user device over the meshnet connection, a meshnet initiation packet that includes a network initiation packet for communicating with the external device, the network initiation packet including the domain information, as discussed elsewhere herein.

As shown by reference numeral 450, process 400 may include the second user device transmitting, over a network connection, the network initiation packet to the external device based at least in part on utilizing the domain information in the network initiation packet. For instance, the second user device may utilize the associated communication interface, memory, and/or processor to transmit, over a network connection, the network initiation packet to the external device based at least in part on utilizing the domain information in the network initiation packet, as discussed elsewhere herein.

Process 400 may include additional aspects, such as any single aspect or any combination of aspects described below and/or in connection with one or more other processes described elsewhere herein.

In a first aspect, process 400 may include the first user device receiving, from the second user device over the meshnet connection, the access information utilized by the second user device to access the DNS server.

In a second aspect, alone or in combination with the first aspect, process 400 may include the first user device selecting the second user device as an exit device in the mesh network such that communication between the first user device and the external device is communicated via the second user device.

In a third aspect, alone or in combination with the first through second aspects, process 400 may include the second user device utilizing a subnet Internet protocol (IP) address assigned to the second user device in the LAN to transmit the DNS query packet to the DNS server and to receive the domain information from the DNS server.

In a fourth aspect, alone or in combination with the first through third aspects, in process 400, transmitting the DNS query packet includes the second user device modifying the DNS query packet to indicate the DNS server as a destination of the DNS query packet.

In a fifth aspect, alone or in combination with the first through fourth aspects, in process 400, transmitting the network initiation packet includes the second user device modifying the network initiation packet to indicate the external device as a destination of the network initiation packet.

In a sixth aspect, alone or in combination with the first through fifth aspects, in process 400, transmitting the meshnet query packet includes the first user device transmitting an encrypted meshnet query packet, which is determined based at least in part on encrypting the meshnet query packet by utilizing a cryptographic key associated with the meshnet connection.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with sharing DNS resources in a mesh network, according to various aspects of the present disclosure. In some aspects, the process 500 may be performed by a memory and/or a processor/controller (e.g., processing unit 116, processor 720) associated with a first user device (e.g., user device 102) executing a client application. In some aspects, the first user device may be in communication with a second user device in a mesh network, the second user device being connected to a local area network (LAN) including a domain name service (DNS) server. As shown by reference numeral 510, process 500 may include selecting, by the first user device while communicating in the mesh network, the second user device as an exit device with respect to the first user device such that communication between the first user device and an external device, outside the mesh network, is communicated via the second user device. For instance, the first user device may utilize the associated memory and/or processor to select, while communicating in the mesh network, the second user device as an exit device with respect to the first user device such that communication between the first user device and an external device, outside the mesh network, is communicated via the second user device, as discussed elsewhere herein.

As shown by reference numeral 520, process 500 may include receiving, by the first user device from the second user device, access information utilized by the second user device to access the DNS server in the LAN. For instance, the first user device may utilize an associated communication interface (e.g., communication interface 770) along with the associated memory and/or processor to receive, from the second user device, access information utilized by the second user device to access the DNS server in the LAN, as discussed elsewhere herein.

As shown by reference numeral 530, process 500 may include transmitting, by the first user device to the second user device, a meshnet query packet that includes a DNS query for domain information associated with the external device, the DNS query including the access information to indicate that the second user device is to utilize the DNS server in the LAN to obtain the domain information. For instance, the first user device may utilize the associated communication interface, memory, and/or processor to transmit, to the second user device, a meshnet query packet that includes a DNS query for domain information associated with the external device, the DNS query including the access information to indicate that the second user device is to utilize the DNS server in the LAN to obtain the domain information, as discussed elsewhere herein.

As shown by reference numeral 540, process 500 may include receiving, by the first user device from the second user device based at least in part on transmitting the meshnet query packet, the domain information associated with the external device. For instance, the first user device may utilize the associated communication interface, memory, and/or processor to receive, from the second user device based at least in part on transmitting the meshnet query packet, the domain information associated with the external dev, as discussed elsewhere herein.

As shown by reference numeral 550, process 500 may include transmitting, by the first user device to the second user device, a meshnet initiation packet that includes a network communication for communicating with the external device, the network communication including the domain information to indicate that the second user device is to utilize the domain information to transmit the network communication to the external device. For instance, the first user device may utilize the associated communication interface, memory, and/or processor to transmit, to the second user device, a meshnet initiation packet that includes a network communication for communicating with the external device, the network communication including the domain information to indicate that the second user device is to utilize the domain information to transmit the network communication to the external device, as discussed elsewhere herein.

Process 500 may include additional aspects, such as any single aspect or any combination of aspects described below and/or in connection with one or more other processes described elsewhere herein.

In a first aspect, in process 500, the access information includes a subnet internet protocol (IP) address assigned to the DNS server in the LAN.

In a second aspect, alone or in combination with the first aspect, in process 500, transmitting the meshnet query packet includes the first user device transmitting an encrypted meshnet query packet, which is determined based at least in part on encrypting the meshnet query packet by utilizing a cryptographic key associated with a meshnet connection between the first user device and the second user device in the mesh network.

In a third aspect, alone or in combination with the first through second aspects, in process 500, transmitting the meshnet initiation packet includes the first user device transmitting an encrypted meshnet initiation packet, which is determined based at least in part on encrypting the meshnet initiation packet by utilizing a cryptographic key associated with a meshnet connection between the first user device and the second user device in the mesh network.

In a fourth aspect, alone or in combination with the first through third aspects, process 500 may include including, by the first user device, the DNS query in a meshnet query payload of the meshnet query packet.

In a fifth aspect, alone or in combination with the first through fourth aspects, in process 500, including, by the first user device, the access information in a DNS query header of the DNS query, the access information indicating the DNS server as a destination of the DNS query.

In a sixth aspect, alone or in combination with the first through fifth aspects, process 500 may include receiving, by the first user device, the domain information in an encrypted meshnet response packet that is encrypted by utilizing a cryptographic key associated with a meshnet connection between the first user device and the second user device in the mesh network.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with sharing DNS resources in a mesh network, according to various aspects of the present disclosure. In some aspects, the process 600 may be performed by a memory and/or a processor/controller (e.g., processing unit 116, processor 720) associated with a first user device (e.g., user device 102) executing a client application. As shown by reference numeral 610, process 600 may include selecting, by the first user device, a second user device in the mesh network as an exit device with respect to the first user device such that communication between the first user device and an external device, outside the mesh network, is communicated via the second user device. For instance, a user device may utilize the associated memory and/or processor to select a second user device in the mesh network as an exit device with respect to the first user device such that communication between the first user device and an external device, outside the mesh network, is communicated via the second user device, as discussed elsewhere herein.

As shown by reference numeral 620, process 600 may include receiving, by the first user device from the second user device, a message indicating that the second user device has selected a third user device in the mesh network as an exit device with respect to the second user device such that communication between the second user device and the external device is communicated via the third user device. For instance, the user device may utilize an associated communication interface (e.g., communication interface 770) along with the associated memory and/or processor to receive, from the second user device, a message indicating that the second user device has selected a third user device in the mesh network as an exit device with respect to the second user device such that communication between the second user device and the external device is communicated via the third user device, as discussed elsewhere herein.

As shown by reference numeral 630, process 600 may include transmitting, by the first user device to the third user device via the second user device, a meshnet query packet that includes a domain name service (DNS) query for domain information associated with the external device, the DNS query including access information that is associated with a DNS server associated with the third user device and indicates that the third user device is to utilize the DNS server to obtain the domain information. For instance, the user device may utilize the associated communication interface, memory, and/or processor to transmit, to the third user device via the second user device, a meshnet query packet that includes a domain name service (DNS) query for domain information associated with the external device, the DNS query including access information that is associated with a DNS server associated with the third user device and indicates that the third user device is to utilize the DNS server to obtain the domain information, as discussed elsewhere herein.

As shown by reference numeral 640, process 600 may include receiving, by the first user device from the third device via the second user device based at least in part on transmitting the meshnet query packet, the domain information associated with the external device. For instance, the user device may utilize the associated communication interface, memory, and/or processor to receive, from the third device via the second user device based at least in part on transmitting the meshnet query packet, the domain information associated with the external device, as discussed elsewhere herein.

As shown by reference numeral 650, process 600 may include transmitting, by the first user device to the third user device via the second user device, a meshnet initiation packet that includes a network communication for communicating with the external device, the network communication including the domain information to indicate that the third user device is to utilize the domain information to transmit the network communication to the external device. For instance, the user device may utilize the associated communication interface, memory, and/or processor to transmit, to the third user device via the second user device, a meshnet initiation packet that includes a network communication for communicating with the external device, the network communication including the domain information to indicate that the third user device is to utilize the domain information to transmit the network communication to the external device, as discussed elsewhere herein.

Process 600 may include additional aspects, such as any single aspect or any combination of aspects described below and/or in connection with one or more other processes described elsewhere herein.

In a first aspect, in process 600, the access information includes a subnet internet protocol (IP) address assigned to the DNS server in a LAN including the third user device and the DNS server.

In a second aspect, alone or in combination with the first aspect, process 600 may include receiving, by the first user device from the third user device, the access information associated with the DNS server.

In a third aspect, alone or in combination with the first through second aspects, in process 600, the meshnet query packet is encrypted by utilizing a first cryptographic key when transmitted by the first user device to the second user device, and is encrypted by utilizing a second cryptographic key when transmitted by the second user device to the third user device.

In a fourth aspect, alone or in combination with the first through third aspects, process 600 may include including, by the first user device, the DNS query in a meshnet query payload of the meshnet query packet.

In a fifth aspect, alone or in combination with the first through fourth aspects, process 600 may include including, by the first user device, the access information in a DNS query header of the DNS query, the access information indicating the DNS server as a destination of the DNS query.

In a sixth aspect, alone or in combination with the first through fifth aspects, process 600 may include receiving, by the first user device, the domain information in an encrypted meshnet response packet that is encrypted by utilizing a cryptographic key associated with a meshnet connection between the first user device and the second user device in the mesh network.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700 associated with sharing DNS resources in a mesh network, according to various aspects of the present disclosure. In some aspects, the example devices 700 may form part of or implement the systems, servers, environments, infrastructures, components, devices, or the like described elsewhere herein (e.g., MSP control infrastructure, VPN server, etc.) and may be used to perform example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A mesh network, comprising:
   a first user device; and
   a second user device in communication with the first user device via a meshnet connection in the mesh network, the second user device being connected to a local area network (LAN) that includes a domain name service (DNS) server, the first user device being outside the LAN, wherein
   the first user device is configured to transmit, to the second user device over the meshnet connection, a meshnet query packet that includes a DNS query packet querying for domain information associated with an external device that is outside the mesh network, the DNS query packet including access information associated with the DNS server to indicate that the second user device is to utilize the DNS server in the LAN to obtain the domain information;
   the second user device is configured to transmit, over a LAN connection, the DNS query packet to the DNS server, and to receive, over the LAN connection based at least in part on transmitting the DNS query packet, the domain information from the DNS server;
   the second user device is configured to transmit, to the first user device over the meshnet connection, the domain information associated with the external device;
   the first user device is configured to transmit, to the second user device over the meshnet connection, a meshnet initiation packet that includes a network initiation packet for communicating with the external device, the network initiation packet including the domain information; and
   the second user device is configured to transmit, over a network connection, the network initiation packet to the external device based at least in part on utilizing the domain information in the network initiation packet.

2. The mesh network of claim 1, wherein the first user device is configured to receive, from the second user device over the meshnet connection, the access information utilized by the second user device to access the DNS server.

3. The mesh network of claim 1, wherein the first user device is connected to another LAN that includes another DNS server.

4. The mesh network of claim 1, wherein the second user device is configured to utilize a subnet Internet protocol (IP) address assigned to the second user device in the LAN to transmit the DNS query packet to the DNS server and to receive the domain information from the DNS server.

5. The mesh network of claim 1, wherein, to transmit the DNS query packet, the second user device is configured to modify the DNS query packet to indicate the DNS server as a destination of the DNS query packet.

6. The mesh network of claim 1, wherein, to transmit the network initiation packet, the second user device is configured to modify the network initiation packet to indicate the external device as a destination of the network initiation packet.

7. The mesh network of claim 1, wherein, to transmit the meshnet query packet, the first user device is configured to transmit an encrypted meshnet query packet, which is determined based at least in part on encrypting the meshnet query packet by utilizing a cryptographic key associated with the meshnet connection.

8. A method in a mesh network including a first user device and a second user device in communication with each other via a meshnet connection, the second user device being connected to a local area network (LAN) that includes a domain name service (DNS) server, the first user device being outside the LAN, the method comprising:
- the first user device transmitting, to the second user device over the meshnet connection, a meshnet query packet that includes a DNS query packet querying for domain information associated with an external device that is outside the mesh network, the DNS query packet including access information associated with the DNS server to indicate that the second user device is to utilize the DNS server in the LAN to obtain the domain information;
- the second user device transmitting, over a LAN connection, the DNS query packet to the DNS server, and receiving, over the LAN connection based at least in part on transmitting the DNS query packet, the domain information from the DNS server;
- the second user device transmitting, to the first user device over the meshnet connection, the domain information associated with the external device;
- the first user device transmitting, to the second user device over the meshnet connection, a meshnet initiation packet that includes a network initiation packet for communicating with the external device, the network initiation packet including the domain information; and
- the second user device transmitting, over a network connection, the network initiation packet to the external device based at least in part on utilizing the domain information in the network initiation packet.

9. The method of claim 8, further comprising:
- the first user device receiving, from the second user device over the meshnet connection, the access information utilized by the second user device to access the DNS server.

10. The method of claim 8, wherein the first user device is connected to another LAN that includes another DNS server.

11. The method of claim 8, further comprising:
- the second user device utilizing a subnet Internet protocol (IP) address assigned to the second user device in the LAN to transmit the DNS query packet to the DNS server and to receive the domain information from the DNS server.

12. The method of claim 8, wherein transmitting the DNS query packet includes the second user device modifying the DNS query packet to indicate the DNS server as a destination of the DNS query packet.

13. The method of claim 8, wherein transmitting the network initiation packet includes the second user device modifying the network initiation packet to indicate the external device as a destination of the network initiation packet.

14. The method of claim 8, wherein transmitting the meshnet query packet includes the first user device transmitting an encrypted meshnet query packet, which is determined based at least in part on encrypting the meshnet query packet by utilizing a cryptographic key associated with the meshnet connection.

15. A non-transitory computer-readable medium configured to store instructions, which when executed by a first user device or a second user device in communication with each other via a meshnet connection in a mesh network, the second user device being connected to a local area network (LAN) that includes a domain name service (DNS) server, the first user device being outside the LAN,
- configure the first user device to transmit, to the second user device over the meshnet connection, a meshnet query packet that includes a DNS query packet querying for domain information associated with an external device that is outside the mesh network, the DNS query packet including access information associated with the DNS server to indicate that the second user device is to utilize the DNS server in the LAN to obtain the domain information;
- configure the second user device to transmit, over a LAN connection, the DNS query packet to the DNS server, and to receive, over the LAN connection based at least in part on transmitting the DNS query packet, the domain information from the DNS server;
- configure the second user device to transmit, to the first user device over the meshnet connection, the domain information associated with the external device;
- configure the first user device to transmit, to the second user device over the meshnet connection, a meshnet initiation packet that includes a network initiation packet for communicating with the external device, the network initiation packet including the domain information; and
- configure the second user device to transmit, over a network connection, the network initiation packet to the external device based at least in part on utilizing the domain information in the network initiation packet.

16. The non-transitory computer-readable medium of claim 15, wherein the first user device is configured to receive, from the second user device over the meshnet connection, the access information utilized by the second user device to access the DNS server.

17. The non-transitory computer-readable medium of claim 15, wherein the first user device is connected to another LAN that includes another DNS server.

18. The non-transitory computer-readable medium of claim 15, wherein the second user device is configured to utilize a subnet Internet protocol (IP) address assigned to the second user device in the LAN to transmit the DNS query packet to the DNS server and to receive the domain information from the DNS server.

19. The non-transitory computer-readable medium of claim 15, wherein, to transmit the DNS query packet, the second user device is configured to modify the DNS query packet to indicate the DNS server as a destination of the DNS query packet.

20. The non-transitory computer-readable medium of claim 15, wherein, to transmit the network initiation packet, the second user device is configured to modify the network initiation packet to indicate the external device as a destination of the network initiation packet.

* * * * *